(12) United States Patent
Blaine et al.

(10) Patent No.: US 11,498,235 B2
(45) Date of Patent: Nov. 15, 2022

(54) METHOD FOR PROCESSING FOOD ITEM

(71) Applicants: John Bean Technologies Corporation, Chicago, IL (US); Nordischer Maschinenbau Rud. Baader GmbH + Co. KG, Lübeck (DE)

(72) Inventors: George R. Blaine, Lake Stevens, WA (US); Jon A. Hocker, Bothell, WA (US); Alexander Steffens, Lübeck (DE)

(73) Assignees: John Bean Technologies Corporation, Chicago, IL (US); Nordischer Maschinenbau Rud. Baader GmbH + Co. KG, Lübeck (DE)

( * ) Notice: Subject to any disclaimer, the term of this patent is extended or adjusted under 35 U.S.C. 154(b) by 256 days.

(21) Appl. No.: 16/845,853

(22) Filed: Apr. 10, 2020

(65) Prior Publication Data

US 2020/0238556 A1 Jul. 30, 2020

Related U.S. Application Data

(60) Division of application No. 15/658,817, filed on Jul. 25, 2017, now Pat. No. 10,654,185, which is a
(Continued)

(30) Foreign Application Priority Data

Dec. 29, 2016 (EP) ..................................... 16207287

(51) Int. Cl.
*B26D 5/00* (2006.01)
*B26F 3/00* (2006.01)
(Continued)

(52) U.S. Cl.
CPC .......... *B26D 5/007* (2013.01); *A22C 17/0086* (2013.01); *A47J 36/00* (2013.01);
(Continued)

(58) Field of Classification Search
CPC ........ G01N 33/02; G01N 23/04; G01N 21/27; G01N 2223/639; G01N 2223/643;
(Continued)

(56) References Cited

U.S. PATENT DOCUMENTS 4,557,019 A 12/1985 Van Devanter et al.
4,748,724 A 6/1988 Lapeyre et al.
(Continued)

FOREIGN PATENT DOCUMENTS

CA 233996 A1 3/2000
CN 1303234 A 7/2001
(Continued)

OTHER PUBLICATIONS

Decision of Refusal dated Sep. 29, 2020, issued in Japanese Application No. 2019-526365, filed Jul. 25, 2017, 13 pages.
(Continued)

*Primary Examiner* — Phuong T Nguyen
(74) *Attorney, Agent, or Firm* — Christensen O'Connor Johnson Kindness PLLC

(57) ABSTRACT

A processing system (10) and corresponding method (158) are provided for processing workpieces (WP), including food items, to cut and remove undesirable components from the food items and/or portion the food items while being conveyed on a conveyor system (12). An X-ray scanning station (14) is located on an upstream conveyor section (20) to ascertain size and/or shape parameters of the food items as well as the location of any undesirable components of the food items, such as bones, fat or cartilage. Thereafter the food items are transferred to a downstream conveyor (20) at which is located an optical scanner (102) to ascertain the size and/or shape parameters of the food items. The results of the X-ray and optical scanning are transmitted to a processor (18) to confirm that the food item scanned by the optical
(Continued)

scanner is the same as that previously scanned by the X-ray scanner. Once this identity is confirmed, if required, the data from the X-ray scanner is translated or transformed onto the data from the optical scanner. Such translation may include one or more of the shifting of the food items in the X and/or Y direction, rotation of the food item, scaling of the size of the food item, and sheer distortion of the food item. Next, the location of the undesirable material within the food item is mapped from the X-ray scanning data onto the optical scanning data. Thereafter, the undesirable material is removed by a cutter(s) (28). The food item may also (or alternatively) been portioned by the cutter(s) (28).

20 Claims, 9 Drawing Sheets

Related U.S. Application Data continuation-in-part of application No. 15/394,208, filed on Dec. 29, 2016, now Pat. No. 10,721,947.

(60) Provisional application No. 62/368,941, filed on Jul. 29, 2016.

(51) Int. Cl.
   *B26D 7/30*    (2006.01)
   *B26D 7/06*    (2006.01)
   *G05B 19/418*  (2006.01)
   *G05B 19/18*   (2006.01)
   *A47J 36/00*   (2006.01)
   *A22C 17/00*   (2006.01)

(52) U.S. Cl.
   CPC ........... *B26D 5/005* (2013.01); *B26D 7/0625* (2013.01); *B26D 7/30* (2013.01); *B26F 3/004* (2013.01); *G05B 19/188* (2013.01); *G05B 19/4189* (2013.01); *B26D 2210/02* (2013.01); *G05B 2219/37569* (2013.01); *G05B 2219/49075* (2013.01)

(58) Field of Classification Search
   CPC ................. G01N 23/083; G01N 23/10; G01N 2223/646; G01V 5/0016; G01V 5/0066; G01V 5/0008
   USPC ......... 99/290, 297, 349, 353, 489, 535, 537, 99/538
   See application file for complete search history.

(56) References Cited

U.S. PATENT DOCUMENTS

| | | | |
|---|---|---|---|
| 4,875,254 A | 10/1989 | Rudy et al. | |
| 4,970,757 A | 11/1990 | Heiland et al. | |
| 5,162,016 A | 11/1992 | Malloy | |
| 5,205,779 A | 4/1993 | O'Brien et al. | |
| 5,585,603 A | 12/1996 | Vogeley, Jr. | |
| 5,937,080 A | 8/1999 | Vogeley, Jr. et al. | |
| 6,563,904 B2 | 5/2003 | Wijts et al. | |
| 6,859,282 B1 | 2/2005 | Weber et al. | |
| 6,882,434 B1 | 4/2005 | Sandberg et al. | |
| 7,025,196 B2 | 4/2006 | Pfarr et al. | |
| 7,052,388 B2 | 5/2006 | Houtz | |
| 7,153,203 B2 | 12/2006 | Pfarr et al. | |
| 7,158,915 B2 | 1/2007 | Wargon | |
| 7,251,537 B1 | 7/2007 | Blaine et al. | |
| 7,404,759 B2 | 7/2008 | Sato | |
| 7,593,785 B2 | 9/2009 | Blaine et al. | |
| 7,621,806 B2 | 11/2009 | Bottemiller et al. | |
| 7,651,388 B2 | 1/2010 | Faires et al. | |
| 7,672,752 B2 | 3/2010 | Blaine et al. | |
| 7,715,935 B2 | 5/2010 | Vogeley, Jr. et al. | |
| 7,747,042 B2 | 6/2010 | Blaine | |
| 7,857,686 B2 | 12/2010 | Amason | |
| 7,861,630 B2 | 1/2011 | Sorensen et al. | |
| 7,949,414 B2 | 5/2011 | Blaine et al. | |
| 8,096,860 B2 | 1/2012 | Bolte et al. | |
| 8,116,554 B2 | 2/2012 | Burton | |
| 8,147,299 B2 | 4/2012 | McKenna et al. | |
| 8,166,856 B2 | 5/2012 | Kim et al. | |
| 8,351,672 B2 | 1/2013 | Tao et al. | |
| 8,376,814 B2 | 2/2013 | Hattori et al. | |
| 8,412,366 B2 | 4/2013 | Blaine et al. | |
| 8,529,321 B2 | 9/2013 | Weber | |
| 8,643,851 B2 | 2/2014 | Weber | |
| 8,688,259 B1 | 4/2014 | Blaine et al. | |
| 8,688,267 B2 | 4/2014 | Blaine et al. | |
| 8,820,534 B2 | 9/2014 | Thorsson et al. | |
| 8,839,949 B2 | 9/2014 | Vogeley, Jr. | |
| 8,915,773 B2 | 12/2014 | Nielsen | |
| 2002/0067797 A1 | 6/2002 | Safai et al. | |
| 2003/0036344 A1 | 2/2003 | Sigurdsson et al. | |
| 2004/0231480 A1 | 11/2004 | Wattles et al. | |
| 2005/0032471 A1 | 2/2005 | Pfarr et al. | |
| 2006/0154587 A1 | 7/2006 | Mikkelsen et al. | |
| 2006/0161380 A1 | 7/2006 | Bottemiller | |
| 2012/0040060 A1 | 2/2012 | Virippil et al. | |
| 2012/0128838 A1 | 5/2012 | Virippil et al. | |
| 2012/0212603 A1 | 8/2012 | Lindee et al. | |
| 2012/0307013 A1* | 12/2012 | Hjalmarsson ...... A22C 17/0086 348/46 |
| 2014/0205739 A1 | 7/2014 | McKenna et al. | |
| 2014/0220193 A1 | 8/2014 | Hocker et al. | |
| 2014/0326644 A1 | 11/2014 | Thorsson et al. | |
| 2015/0033921 A1 | 2/2015 | Finnsson | |
| 2015/0241341 A1 | 8/2015 | Ikeda | |
| 2017/0212506 A1 | 7/2017 | Pfarr et al. | |

FOREIGN PATENT DOCUMENTS

| | | |
|---|---|---|
| CN | 102421297 A | 4/2012 |
| CN | 10272989 A | 10/2012 |
| CN | 102729289 A | 10/2012 |
| CN | 104220348 A | 12/2014 |
| CN | 104700104 A | 6/2015 |
| CN | 104737003 A | 8/2015 |
| DE | 691 04 122 T2 | 3/1995 |
| EP | 1 174 034 A1 | 1/2002 |
| EP | 1 889 542 A1 | 2/2008 |
| EP | 2353305 A1 | 8/2011 |
| EP | 2353395 A1 | 8/2011 |
| EP | 2 531 038 A1 | 12/2012 |
| EP | 2 878 203 A1 | 6/2015 |
| FR | 2 894 433 A1 | 6/2007 |
| FR | 2 965 619 A1 | 4/2012 |
| GB | 2 285 126 A | 6/1995 |
| GB | 2 364 894 A | 2/2002 |
| GB | 2 405 081 A | 2/2005 |
| JP | 2006208098 A | 8/2006 |
| JP | 2012078303 A | 4/2012 |
| JP | 2016-038364 A | 3/2016 |
| SU | 542140 A1 | 1/1977 |
| WO | 89/008983 A1 | 10/1989 |
| WO | 00/013864 A1 | 3/2000 |
| WO | 2001/032369 A1 | 5/2001 |
| WO | 02/043502 A2 | 6/2002 |
| WO | 02/43502 A2 | 6/2002 |
| WO | 2004/106020 A1 | 12/2004 |
| WO | 2006/064521 A1 | 6/2006 |
| WO | 2006/092311 A1 | 9/2006 |
| WO | 2007/022782 A2 | 3/2007 |
| WO | 2009/102479 A2 | 8/2009 |
| WO | 2010/114397 A1 | 10/2010 |
| WO | 2011095998 A1 | 8/2011 |
| WO | 2011/113081 A1 | 9/2011 |
| WO | 2012/088437 A2 | 6/2012 |
| WO | 2013/155449 A1 | 10/2013 |
| WO | 2013/156159 A1 | 10/2013 |
| WO | 2014/061461 A1 | 4/2014 |
| WO | 2014/100829 A1 | 6/2014 |

(56) References Cited

FOREIGN PATENT DOCUMENTS

| WO | 2014091006 A1 | 6/2014 |
|---|---|---|
| WO | 2015/003750 A1 | 1/2015 |
| WO | 2015/079039 A1 | 6/2015 |
| WO | 2015/198062 A1 | 12/2015 |

OTHER PUBLICATIONS

First Office Action with Search Report dated Oct. 30, 2020, issued in Chinese Patent Application No. 201780047316.8, filed Jul. 25, 2017, 39 pages.
Notification of Reason for Refusal dated Aug. 28, 2020, issued in Korean Patent Application No. 20197004668, filed Jul. 25, 2017, 22 pages.
Communication of a Notice of Opposition dated Mar. 1, 2022, issued in European Patent No. 3490383, filed Aug. 7, 2017, 30 pages.
Varzakas, T., and Tzia, C., (eds.), "Handbook of Food Processing: Food Safety, Quality, and Manufacturing Processes," Table of Contents, Preface, and Chapter 14, "Poultry Manufacturing Technologies," by T. Varzakas and V. Feddern, CRC Press, Oct. 2015, 35 pages, and publication data from Google Play, <https//play.google.com/store/books/details?id=CXq9CgAAQBAJ> [retrieved Feb. 17, 2022], 3 pages.
Larsen, A.B.L., et al., "Vision-Based Method for Tracking Meat Cuts in Slaughterhouses," Meat Science 96(1):366-372, Jan. 2014.
Second Office Action dated Jun. 18, 2021, issued in Chinese Patent Application No. 201780047316.8, filed Jul. 25, 2017, 35 pages.
First Office Action with Search Report dated Oct. 30, 2020, issued in Chinese Patent Application No. 201780054497.7, filed Jul. 25, 2017, 35 pages.
Second Office Action dated Jun. 18, 2021, issued in Chinese Patent Application No. 201780054497.7, filed Jul. 25, 2017, 39 pages.
Second Office Action dated Jun. 1, 2021, issued in Chinese Patent Application No. 201780047316.8, filed Jul. 25, 2017, 21 pages.
Office Action dated Jul. 5, 2021, issued in Japanese Patent Application No. 2019-526189, filed Jul. 25, 2017, 7 pages.
Decision to Grant and Search Report dated Nov. 5, 2020, in Russian Application No. 2019104179/10, filed Jul. 27, 2017, 22 pages.
Jing, H., "Laser Range Imaging for On-Line Mapping of 3D Images to Pseudo-X-Ray Images for Poultry Bone Fragment Detection," doctoral dissertation, University of Maryland, College Park, 2003, 159 pages.
Machine Translation of the International Search Report and Written Opinion dated Jul. 25, 2017, issued in related International Application No. PCT/EP2017/068737, filed Jul. 25, 2017, 13 pages.
"Waterjet Cutting of Fish Under X-Ray," Food Trade Magazine, Jul. 1, 2012, 2 pages.
International Search Report and Written Opinion dated Nov. 7, 2017, issued in corresponding International Application No. PCT/US2017/043687, filed Jul. 25, 2017, 12 pages.
International Search Report and Written Opinion dated Nov. 13, 2017, issued in related International Application No. PCT/EP2017/068737, filed Jul. 25, 2017, 12 pages.
Extended European Search Report dated Aug. 30, 3017, issued in corresponding Application No. EP 16207287.0, filed Dec. 29, 2016, 18 pages.
International Preliminary Report on Patentability dated Feb. 7, 2019, issued in corresponding International Application No. PCT/US2017/043687, filed Jul. 25, 2017, 9 pages.
Examination Report dated Oct. 11, 2019, issued in DK Application No. PA 2019 00128, filed Jan. 30, 2019, 8 pages.
International Preliminary Report on Patentability dated Feb. 7, 2019, issued in International Application No. PCT/EP2017/068737, filed Jul. 25, 2017, 18 pages.
Examination Report dated Sep. 17, 2019, issued in DK Application No. PA 2019 00126, filed Jul. 25, 2017, 7 pages.
Notice of the Reason for Refusal dated Feb. 18, 2020, issued in Japanese Application No. 2019-526365, filed Jul. 25, 2017, 19 pages.
Third Office Action dated Nov. 5, 2021, issued in Chinese Patent Application No. 201780047316.8, filed Jul. 25, 2017, 9 pages.
Decision dated Jan. 27, 2022, issued in Chinese Patent Application No. 201780054497.7, filed Jul. 25, 2017, 26 pages.
First Office Action with Search Report dated Sep. 29, 2020, issued in Chinese Patent Application No. 201780047316.8, filed Jul. 25, 2017, 30 pages.
Office Action dated Jun. 21, 2022, issued in Korean Patent Application No. KR10-2019-7004810, filed Jul. 25, 2017, 6 pages.

\* cited by examiner

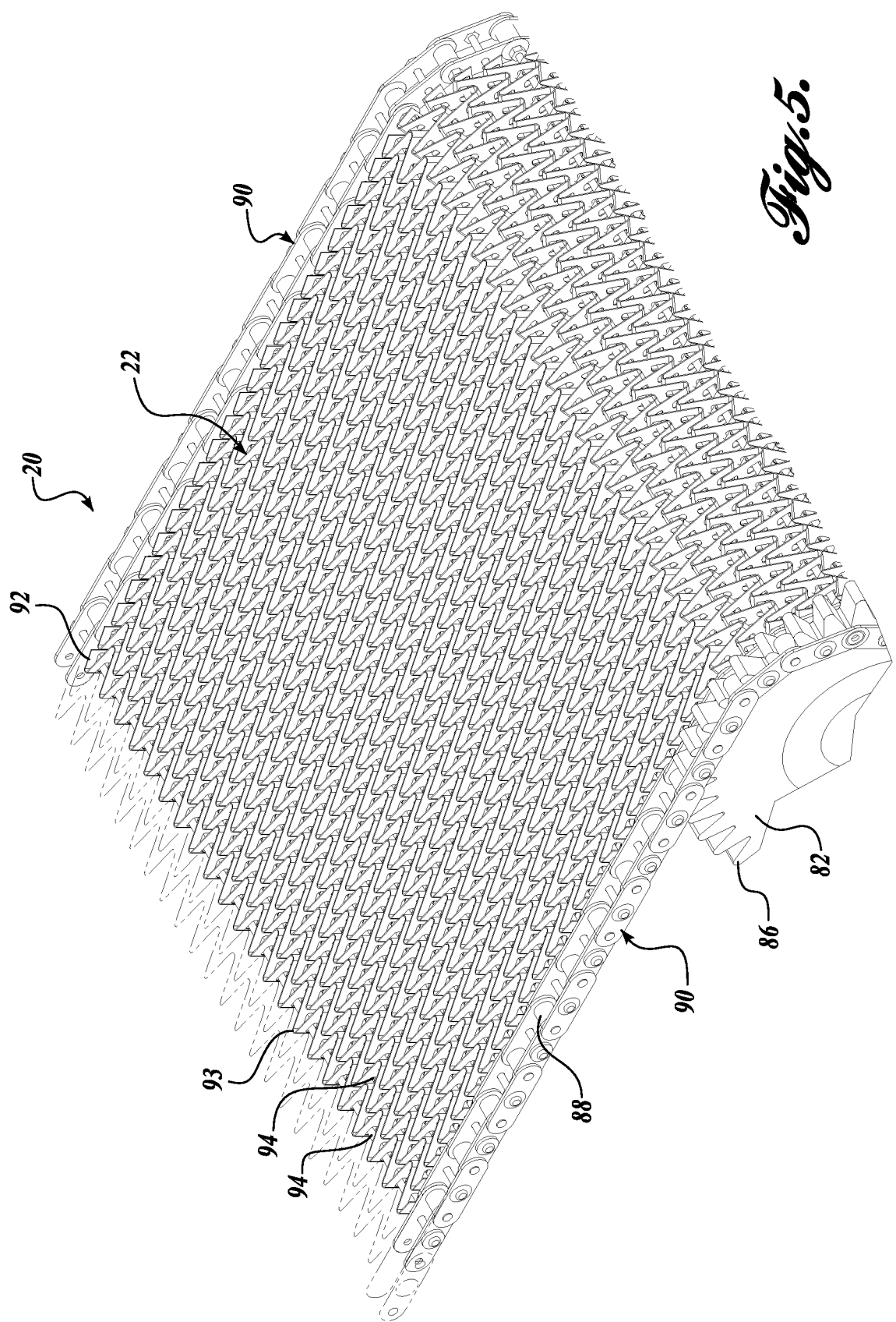

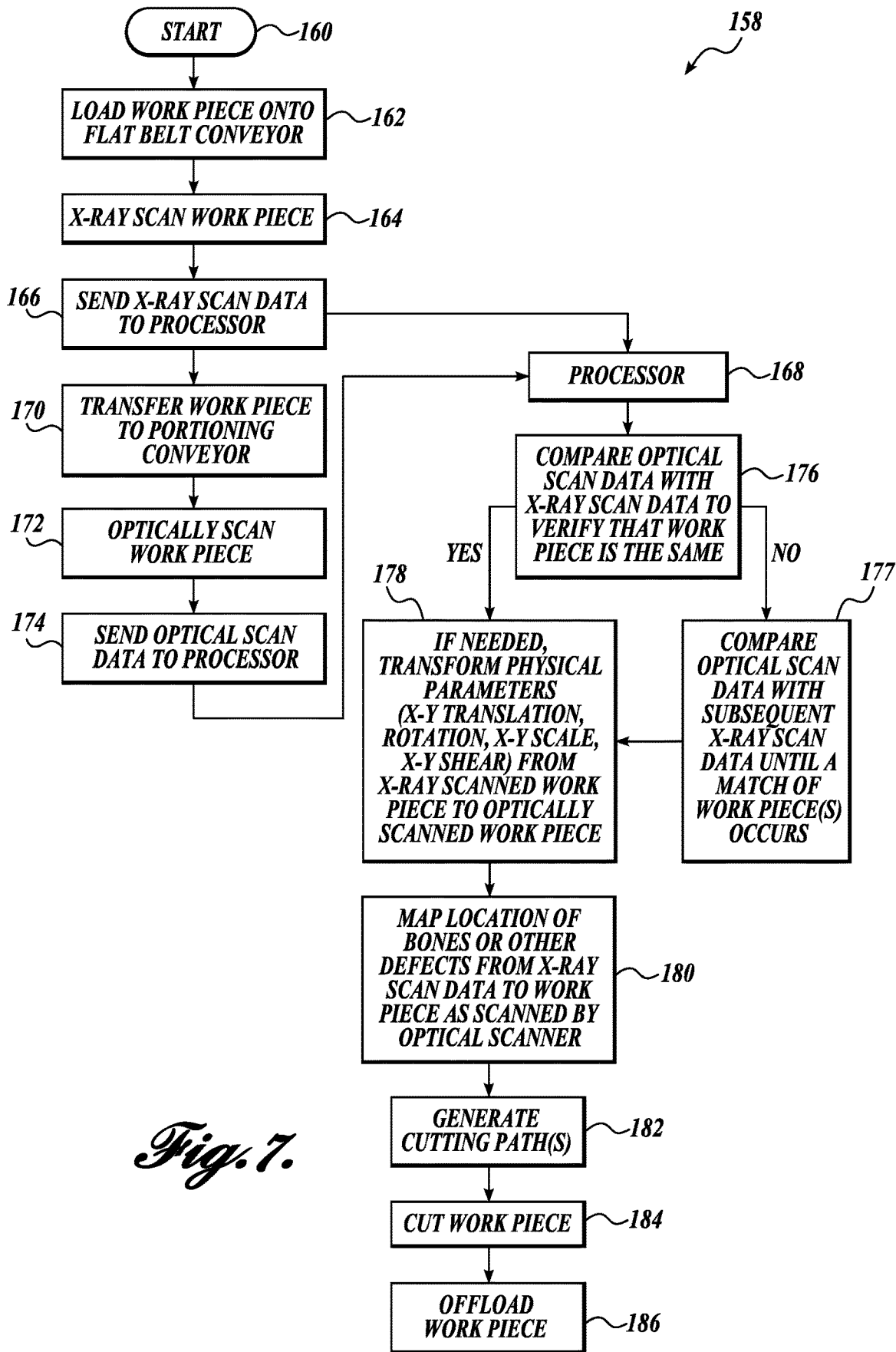

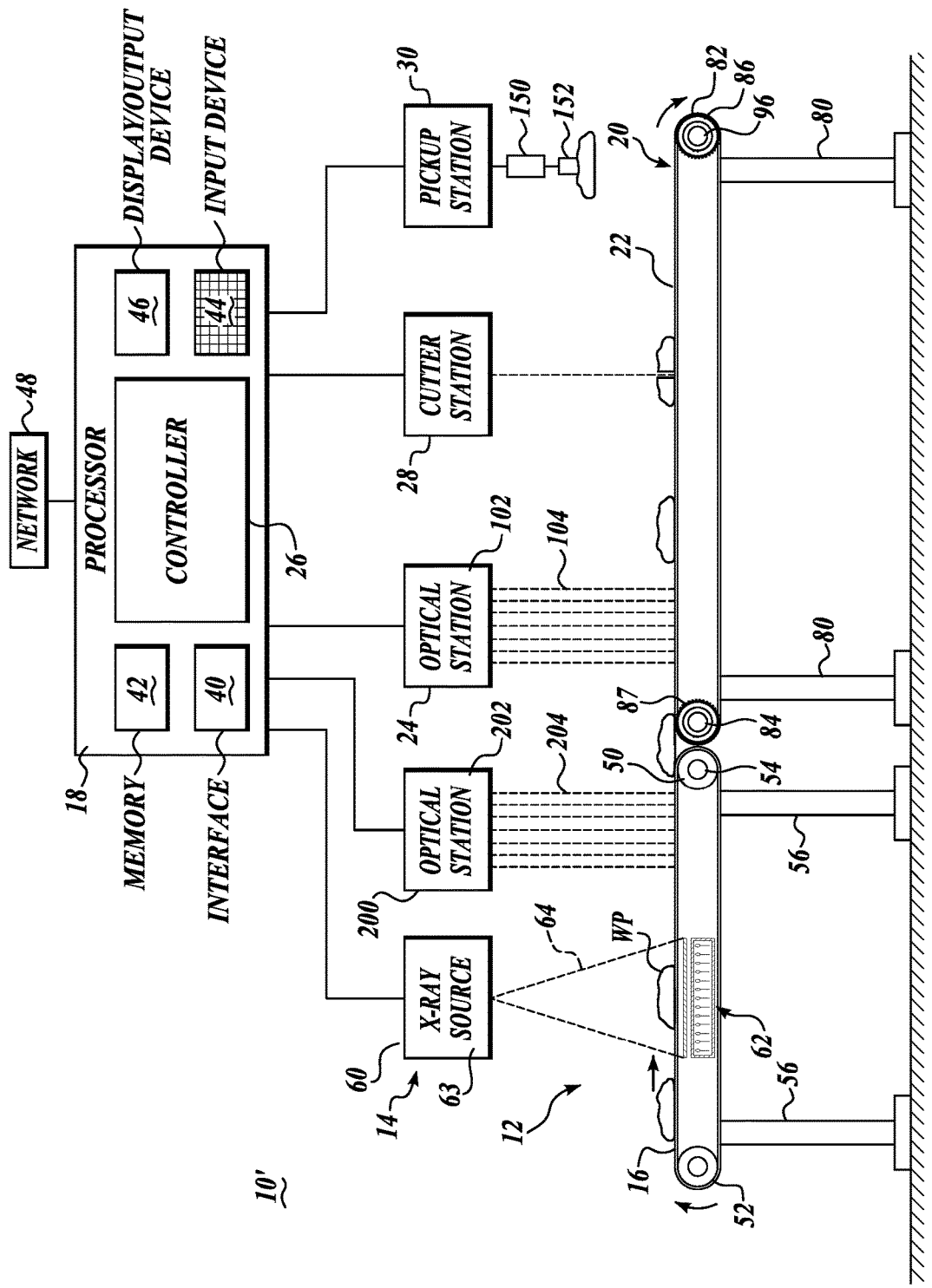

METHOD FOR PROCESSING FOOD ITEM

CROSS-REFERENCES TO RELATED APPLICATIONS

This application is a division of U.S. patent application Ser. No. 15/658,817, filed Jul. 25, 2017, which claims the benefit of U.S. Provisional Application No. 62/368,941, filed Jul. 29, 2016, and which claims priority to EP 16207287.0, filed Dec. 29, 2016, and which is a continuation in part of U.S. patent application Ser. No. 15/394,208, filed Dec. 29, 2016, which claims the benefit of U.S. Provisional Application No. 62/368,941, filed Jul. 29, 2016, all of which applications are expressly incorporated herein by reference in their entirety.

BACKGROUND

The processing of meat, poultry, fish and other food products has included the portioning of the food products to desired sizes, weights, shapes, etc., as well as the locating and removal of undesirable material or components or defects (collectively or individually "materials") from the food products, such as bones, cartilage, fat, metal, glass, plastic, etc. In the past, these processes have been carried out by hand, which was a labor-intensive endeavor. More recently, systems and methods have been developed to portion food products with the use of automated portioning machines. Attempts also have been made to automate the locating and removal of undesirable materials from food products. Early systems have included the use of optical scanners, sonar scanners, and mechanical devices, such as needles, for detecting the location of undesirable materials in the food product. Once located, bones or other undesirable materials/defects may be excised from the food product using, for example, high-pressure waterjet cutters.

Subsequent developments have included the use of an X-ray scanner to locate the undesirable materials, especially in the interior of the food product. The information from the X-ray scanner is used to control the cutting path of the cutting device(s) whether one or more knives, waterjet cutters, or other type of cutters. The food product typically is carried on a conveyor past an X-ray scanner. The information from the scanner is analyzed to determine the location of the undesirable material in the food product. This information is used to control the operation of a downstream cutter(s).

Successful X-ray scanning requires that the food product be conveyed on a conveyor belt that is permeable to X-rays, such as conveyor belts composed of rubber and/or plastic. However, such conveyor belts are not suitable for conveying the food product during the cutting/excising process using a waterjet cutter(s). Rather, for waterjet cutting, a robust metallic belt of a grid or "open" construction is needed to withstand the impact of the high-pressure waterjet as well as allow the waterjet to pass downwardly through the belt, for example, after cutting through the workpiece. As such, the food product is transferred from the initial rubber or plastic belt associated with the X-ray scanner to a metallic grid-type belt for cutting. During this transfer process, the food product may shift relative to the belt, as well as distort or change shape, due to various causes such as a difference in the speeds of the belts, misalignment of the belts, difference in "grip" of the belts on the food products, etc. As a consequence, the location of the food product on the conveyor, and/or the configuration of the food product detected by the X-ray scanner, may not coincide with the food product that reaches the downstream waterjet or other cutter(s) being used. This can result in inaccuracies in the cutting and/or portioning of the food product.

In an effort to address the foregoing situation, systems have been developed which utilize an X-ray scanner associated with the first flat X-ray permeable belt and a second optical scanner located over the metallic, open grid belt. A tracking mechanism is used for tracking the position of the food items at all times while on the initial X-ray belt and also on the metallic open grid cutting belt. The tracking position data is said to be used to determine an estimated position of the food item on the second open grid belt so that the system can confirm that the optically scanned food product is the same food product as was previously scanned by the X-ray system. The computer processor maps the X-ray image data regarding the location of the bones, cartilage, fat, etc., onto the second image data generated by the vision system.

The present disclosure is directed at improved systems and methods for locating and removing undesirable material from food products utilizing an X-ray scanner positioned over a first X-ray permeable belt and a second optical scanner positioned over a downstream metallic, open grid-type belt. The improved systems and methods can also be used to portion the food products into desired sizes, shapes, weights, etc.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system is provided for processing workpieces, including workpieces in the form of food items, to cut and remove undesirable components from the workpieces and/or to portion the workpieces while the workpieces are being conveyed on a conveyor system. In the context of workpieces in the form of food items, the conveyor system comprises an upstream conveyor section for conveying the food items. An X-ray scanner is positioned at the upstream conveyor section for scanning the food items to ascertain physical parameters of the food items comprising size and/or shape parameters of the food items. One such shape and/or size parameter is the outer perimeter configuration of the food item. The X-ray scanner also ascertains the location(s) of undesirable components to be removed from the food items. The ascertained physical parameters of the food items are represented by a first data set, which corresponds to the size and/or shape parameter(s) of the food items and to the location(s) of the undesirable components of the food items.

From the X-ray scanner, a downstream conveyor section of the conveyor system receives the food items from the upstream conveyor section for further conveyance of the food items. An optical scanner is located at the downstream conveyor section for scanning the food items to ascertain physical parameters of the food items comprising the size and/or shape parameters of the food items as well as the location of the food items on the downstream conveyor section. As with the X-ray scanner, the size and/or shape parameters ascertained by the optical scanner may be in the form of the outer perimeter configuration of the food items. Also, at least some of the ascertained physical parameters of the food item from the optical scanning are represented by a second data set.

The system also includes a cutter(s) for cutting the food item to remove the undesirable food item component and/or to portion the food item.

A processor is provided for controlling the system. In this regard, the processor is configured to receive the first and second data sets and compare the second data set from the optical scanner with the ostensible corresponding first data set from the X-ray scanner. One purpose for this comparison is to verify that the food item scanned by the optical scanner corresponds to the same food item previously scanned by the X-ray scanner.

The processor also compares corresponding portions of the first and second data sets to ascertain the correspondence or match therebetween. If a sufficient variation exists between the first and second data sets pertaining to the size/shape parameters, then translation of the first data set onto the second data set can optionally be carried out. Such translations include one or more of: the directional translation of the food item, rotational translation of the food item, scaling of the size of the food item, and shear distortion of the food item.

The processor also locates the undesirable components of the food item and/or determines how to portion the food item in a desired manner Thereafter, the processor controls the cutter(s) to cut the food item, to remove the undesirable food item components and/or portion the food item whether or not the food item data has been translated.

As noted above, the physical parameter ascertained by the X-ray scanner as well as the optical scanner may comprise the outer perimeter configuration of the food item. In this regard, the first and second data sets may correspond to locations along the outer perimeter of the food item. More specifically, the first and second data sets may correspond to coordinates corresponding to locations along the outer perimeter portion of the food items.

As also noted above, the physical parameters ascertained by the X-ray scanner and/or optical scanner includes size and/or shape parameters of the food items, and more specifically the outer perimeter configurations of the food items. Additional size and/or shape parameters ascertained by the X-ray scanner and/or optical scanner may include the food item length, width, aspect ratio, thickness, thickness profile, contour, outer contour, outer perimeter size, outer perimeter shape and/or weight.

As a further aspect of the present disclosure, if the processor determines that the food item scanned by the optical scanner is not the same food item as the food item previously scanned by the X-ray scanner, then the processor is operable to determine if a subsequent food item scanned by the X-ray scanner is the same food item as scanned by the optical scanner. In this regard, it may be that a food item scanned by the X-ray scanner has been removed from the conveyor system prior to reaching the optical scanner. As such, there will be no corresponding second data set for the first data set of the removed food item. The next data set ascertained by the optical scanner will be for the food item subsequent to the food item removed from the conveyor system. Thus, when the processor compares the data set ascertained by the optical scanner with the data set of the removed food item, a match will not occur. However, in the comparison pertaining to the food item next after the food item removed from the conveyor system, a match of the first and second data sets will occur. In this manner, the present system will determine that the food item removed from the conveyor system never reached the optical scanner.

The comparison of the first and second data sets by the processor can be carried out using various analysis methodology. One such methodology is the Root Mean Square error analysis wherein the values of the first and second data sets can be compared. A second analysis methodology that may be utilized is to compare the standard deviations of selected data values of the first and second data sets. A threshold or benchmark standard deviation may be preset so that deviations below the set value will indicate that the data from the first and second data sets are sufficiently similar that the corresponding food items scanned by the X-ray scanner and the optical scanner are the same. A third analysis methodology that might be utilized is a least squares regression analysis of the data values of the first and second data sets. Other analysis methodologies may be utilized.

It will be appreciated that the foregoing system does not require that the location of the food items along the conveyor system from the X-ray scanner to the optical scanner be monitored.

However, although the location of travel of the food item along the conveyor system is not monitored, if the processor receives a first data set as the food item leaves the upstream conveyor section, then based on the speed of the downstream conveyor section and the location of the optical scanner along the downstream conveyor section, an approximation can be made of the point in time that the X-ray scanned food item would reach the optical scanner.

As a further aspect of the present disclosure, the downstream conveyor can employ a conveyor belt. In such case, the processor upon receiving the first data set can note the position of the conveyor belt relative to the optical scanner, and thereby provide an approximation as to when the food product may arrive at the optical scanner. However, as noted above, this monitoring by the processor is not required under the system of the present disclosure.

Under a further aspect of the present disclosure, a transfer conveyor section can be positioned between the upstream conveyor section and the downstream conveyor section. Such transfer conveyor can be used to accommodate different heights between the first conveyor section and the second conveyor section. In addition, the transfer conveyor can have sharp noses at each end so as to receive the food product from the upstream conveyor and then deliver the food product to the downstream conveyor with little distortion of the food product. In this manner, the adjacent ends of the upstream conveyor section and downstream conveyor section can have traditional relatively large radius noses.

Under a further aspect of the present disclosure, a second optical scanner is positioned at the upstream conveyor section for scanning the food items on the upstream conveyor section to ascertain physical parameters of the food items comprising size and/or shape parameters of the food items. Optionally, the second scanner can also scan the food items to ascertain the location(s) of undesirable components to be removed from the food items. The physical parameters ascertained by the second optical scanner are represented by a third data set corresponding to parameters pertaining to the size and/or shape of the food items and optionally the location(s) of the undesirable components of the food items.

As one option, the first, second and third data sets are transmitted to the processor which compares the second data set from the first optical scanner with the third data set from the second optical scanner. If a sufficient variation exists between the second and third data sets, then translation of the third data set onto the second data set can optionally be carried out. Such translations include one or more of: directional translation in the food item, rotational translation of the food item, scaling of the size of the food item, and sheer distortion of the food item. As an alternative, the output from the X-ray scanner and the second optical scanner can be transmitted to a second data processor associated with the X-ray scanner and the second optical scanner and this second data processor can create the first and third data sets and thus transmit these data sets to the system processor for processing these data sets with the data set of the first optical scanner.

Using the data ascertained by the X-ray scanner and the second optical scanner, the processor locates the undesirable components in the food item. Thereafter, the processor controls a cutter or plurality of cutters to cut the food items to remove the undesirable food item components.

A method is provided for processing workpieces, including workpieces in the form of food items, to cut and remove undesirable components from the workpieces and/or to portion the workpieces while the workpieces are being conveyed on a conveyor system. In the context of workpieces in the form of food items, the method comprises conveying the food items on an upstream conveyor section. The food items are scanned with an X-ray scanner while on the upstream conveyor section, thereby to ascertain physical parameters of the food items comprising size and/or shape parameters of the food items. One such shape and/or size parameter is the outer perimeter configuration of the food item. The location(s) of undesirable components to be removed from the food items is/are also ascertained by the X-ray scanner. The ascertained physical parameters of the food items are represented by a first data set, which corresponds to the size and/or shape parameter(s) of the food items and to the location(s) of the undesirable components of the food items.

From the X-ray scanner, the food items are transferred to a downstream conveyor section for further conveyance. The food items are scanned by an optical scanner located at the downstream conveyor section to ascertain physical parameters of the food items comprising size and/or shape parameters of the food items as well as the location of the food items on the downstream conveyor section. As with the X-ray scanner, the size and/or shape parameters ascertained by the optical scanner may be in the form of the outer perimeter configuration of the food items. Also, at least some of the ascertained physical parameters of the food item from the optical scanning are represented by a second data set.

The food items are next cut by a cutter or plurality of cutters to remove the undesirable food item component and/or to portion the food items.

A processor controls the system. In this regard, the processor receives the first and second data sets and compares the second data set from the optical scanner with the ostensible corresponding first data set from the X-ray scanner. One purpose for this comparison is to verify that the food item scanned by the optical scanner is the same food item previously scanned by the X-ray scanner.

The processor also compares corresponding portions of the first and second data sets pertaining to the size and/or shape parameters to ascertain the correspondence or match therebetween. If a sufficient variation exists between the first and second data sets, then the first data set may be translated onto the second data set. Such translations include one or more of: the directional translation of the food item, rotational translation of the food item, scaling of the size of the food item, and shear distortion of the food item.

The undesirable components on the food item are located by the processor and/or a determination is made as to how to portion the food item in a desired manner Thereafter, the cutters are operated and controlled by the processor to cut the food item thereby to remove the undesirable food item components and/or portion the food item whether or not the food item has been translated.

As noted above, the X-ray scanner as well as the optical scanner ascertain physical parameters of the food items which can comprise the outer perimeter configuration of the food items. In this regard, the first and second data sets generated by the X-ray scanner and optical scanner may correspond to locations along the outer perimeter of the food item. More specifically, the first and second data sets may correspond to coordinates corresponding to locations along the outer perimeter portion of the food items.

As also noted above, the physical parameters ascertained by the X-ray scanner and/or optical scanner include size and/or shape parameters of the food items, and more specifically the outer perimeter configurations of the food items. Additional size and/or shape parameters ascertained by the X-ray scanner and/or optical scanner may include the food item length, width, aspect ratio, thickness, thickness profile, contour, outer contour, outer perimeter size, outer perimeter shape, volume and/or weight.

As a further aspect of the present disclosure, if the processor determines that the food item scanned by the optical scanner is not the same food item as the food item previously scanned by the X-ray scanner, then the processor determines whether a subsequent food item scanned by the X-ray scanner is the same food item as scanned by the optical scanner. In this regard, it may be that a food item scanned by the X-ray scanner has been removed from the conveyor system prior to reaching the optical scanner. As such, there will be no corresponding second data set for the first data set of the removed food item. The next data set ascertained by the optical scanner will be for the food item subsequent to the food item removed from the conveyor system. In this regard, when the data set ascertained by the optical scanner is compared with the data set of the removed food item by the processor, a match will not occur. However, in the comparison pertaining to the next food item after the food item removed from the conveyor system, a match of the first and second data sets will occur (assuming only one food item was removed). In this manner, the present system determines that the food item has been removed from the conveyor system and thus will never reach the optical scanner.

The processor can use various analysis methodologies to compare the first and second data sets. One such methodology is the Root Mean Square error analysis wherein the values of the first and second data sets can be compared. A second analysis methodology that may be utilized is the comparisons of the standard deviation of the data values of the first and second data sets. A threshold or benchmark standard deviation may be preset so that deviations below the set value will indicate that the data from the first and second data sets are sufficiently similar that the corresponding food items scanned by the X-ray scanner and the optical scanner are the same. A third analysis methodology that might be utilized is a least squares regression analysis of the data values of the first and second data sets. Other analysis methodologies may be utilized.

It will be appreciated that under the foregoing method the locations of the food items along the conveyor system from the X-ray scanner to the optical scanner are not monitored or tracked.

However, although the locations of travel of the food items along the conveyor system are not monitored, if the processor receives the first data sets as the food items leave the upstream conveyor section, then based on the speed of the downstream conveyor section and the location of the optical scanner along the downstream conveyor section, the point in time that the X-ray scanned food items would reach the optical scanner can be approximated.

As a further aspect of the present disclosure, the downstream conveyor can employ a conveyor belt. In such case, the processor upon receiving the first data set notes the position of the conveyor belt relative to the optical scanner, and thereby provides an approximation as to when the food product will arrive at the optical scanner. However, as noted above, this monitoring by the processor is not required under the method of the present disclosure.

Under a further aspect of the present disclosure, the food product is transferred from the upstream conveyor section to the downstream conveyor section by the use of a transfer conveyor section located between the upstream conveyor section and the downstream conveyor section. Such transfer conveyor accommodates different heights between the first conveyor section and the second conveyor section. In addition, the transfer conveyor, having sharp noses at each end, receives the food product from the upstream conveyor, and then delivers the food product to the downstream conveyor with little distortion of the food product. In this manner, the adjacent ends of the upstream conveyor section and downstream conveyor section can be constructed with traditional, relatively large radius noses.

Under a further aspect of the present disclosure, the food product is scanned with a second optical scanner located on the upstream conveyor section to ascertain not only physical parameters of the food items comprising size and/or shape parameters of the food items, but also optionally the location of undesirable components to be removed from the food items. Because the X-ray scanner and the second optical scanner are both located at the upstream conveyor section, the X-ray object data can be superimposed directly onto the scan data of the second scanner without having to use a "matching" process. Further, the second data set from the first optical scanner is compared with the third data set from the second optical scanner to determine and verify that the food item scanned by the first optical scanner corresponds to the food item scanned by the second optical scanner.

It will be appreciated that with the use of the second optical scanner, the X-ray scanner is not needed to generate the outer contour of the workpieces for use in matching the workpieces between the upstream and downstream conveyors. Rather, the X-ray scanning data is needed only to locate undesirable materials to be removed from the workpieces and determining cutting paths of the cutter apparatus for the removal of undesirable materials. Further, because the imaging process of the two optical scanners are similar, a potentially better match between the data from the two optical scanners will occur, relative to the data match resulting from generating the outer contour of the workpieces by using the X-ray scanning data.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 is a fragmentary view of the portion of the conveyor which may be utilized with the apparatus and method of the present disclosure;

FIG. 7 is a flow diagram of a work product processing method corresponding to FIGS. 1 and 2;

FIG. 8 is a schematic representation of a second embodiment of an apparatus and method for processing work products in accordance with the present disclosure;

DETAILED DESCRIPTION

Figure 1:
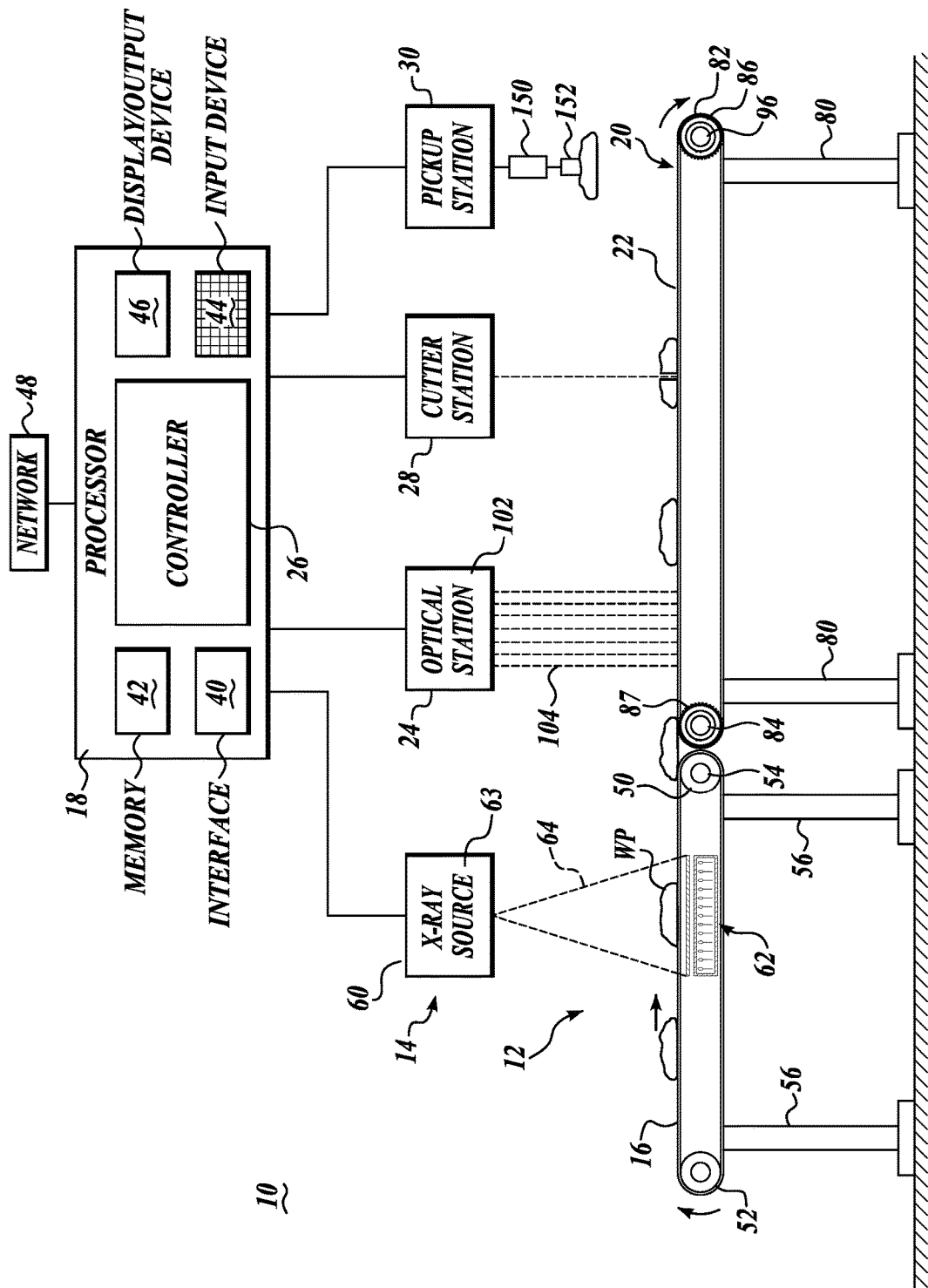
FIG. 1 is a schematic representation of an apparatus and method for processing work products according to a first embodiment of the present disclosure.

The description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "top," "bottom," "right hand," "left hand," "in," "out," "extended," "advanced," "retracted," "proximal," and "distal." These references and other similar references in the present application are only to assist in helping describe and understand the present disclosure and are not intended to limit the present invention to these directions.

The present application may include modifiers such as the words "generally," "approximately," "about", or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out.

In the following description, various embodiments of the present disclosure are described. In the following description and in the accompanying drawings, the corresponding systems assemblies, apparatus and units may be identified by the same part number, but with an alpha suffix. The descriptions of the parts/components of such systems assemblies, apparatus, and units that are the same or similar are not repeated so as to avoid redundancy in the present application.

In the present application and claims, references to "food," "food products," "food pieces," and "food items," are used interchangeably and are meant to include all manner of foods. Such foods may include meat, fish, poultry, fruits, vegetables, nuts, or other types of foods. Also, the present systems and methods are directed to raw food products, as well as partially and/or fully processed or cooked food products.

Further, the system, apparatus and methods disclosed in the present application and defined in the present claims, though specifically applicable to food products or food items, may also be used outside of the food area. Accordingly, the present application and claims reference "work products" and "workpieces," which terms are synonymous with each other. It is to be understood that references to work products and workpieces also include food, food products, food pieces, and food items.

The system and method of the present disclosure include the scanning of workpieces, including food items, to ascertain physical parameters of the workpiece comprising the size and/or shape of the workpiece. Such size and/or shape parameters may include, among other parameters, the length, width, aspect ratio, thickness, thickness profile, contour, outer contour, outer perimeter, outer perimeter configuration, outer perimeter size, outer perimeter shape, volume and/or weight of the workpiece. With respect to the physical parameters of the length, width, length/width aspect ratio, and thickness of the workpieces, including food items, such physical parameters may include the maximum, average, mean, and/or medium values of such parameters. With respect to the thickness profile of the workpiece, such profile can be along the length of the workpiece, across the width of the workpiece, as well as both across/along the width and length of the workpiece.

As noted above, a further parameter of the workpiece that may be ascertained, measured, analyzed, etc., is the contour of the workpiece. The term contour may refer to the outline, shape, and/or form of the workpiece, whether at the base or bottom of the workpiece or at any height along the thickness of the workpiece. The parameter term "outer contour" may refer to the outline, shape, form, etc., of the workpiece along its outermost boundary or edge.

The parameter referred to as the "perimeter" of the workpiece refers to the boundary or distance around a workpiece. Thus, the terms outer perimeter, outer perimeter configuration, outer perimeter size, and outer perimeter shape pertain to the distance around, the configuration, the size and the shape of the outermost boundary or edge of the workpiece.

The foregoing enumerated size and/or shape parameters are not intended to be limiting or inclusive. Other size and/or shape parameters may be ascertained, monitored, measured, etc., by the present system and method. Moreover, the definitions or explanations of the above specific size and/or shape parameters discussed above are not meant to be limiting or inclusive.

Figure 2:
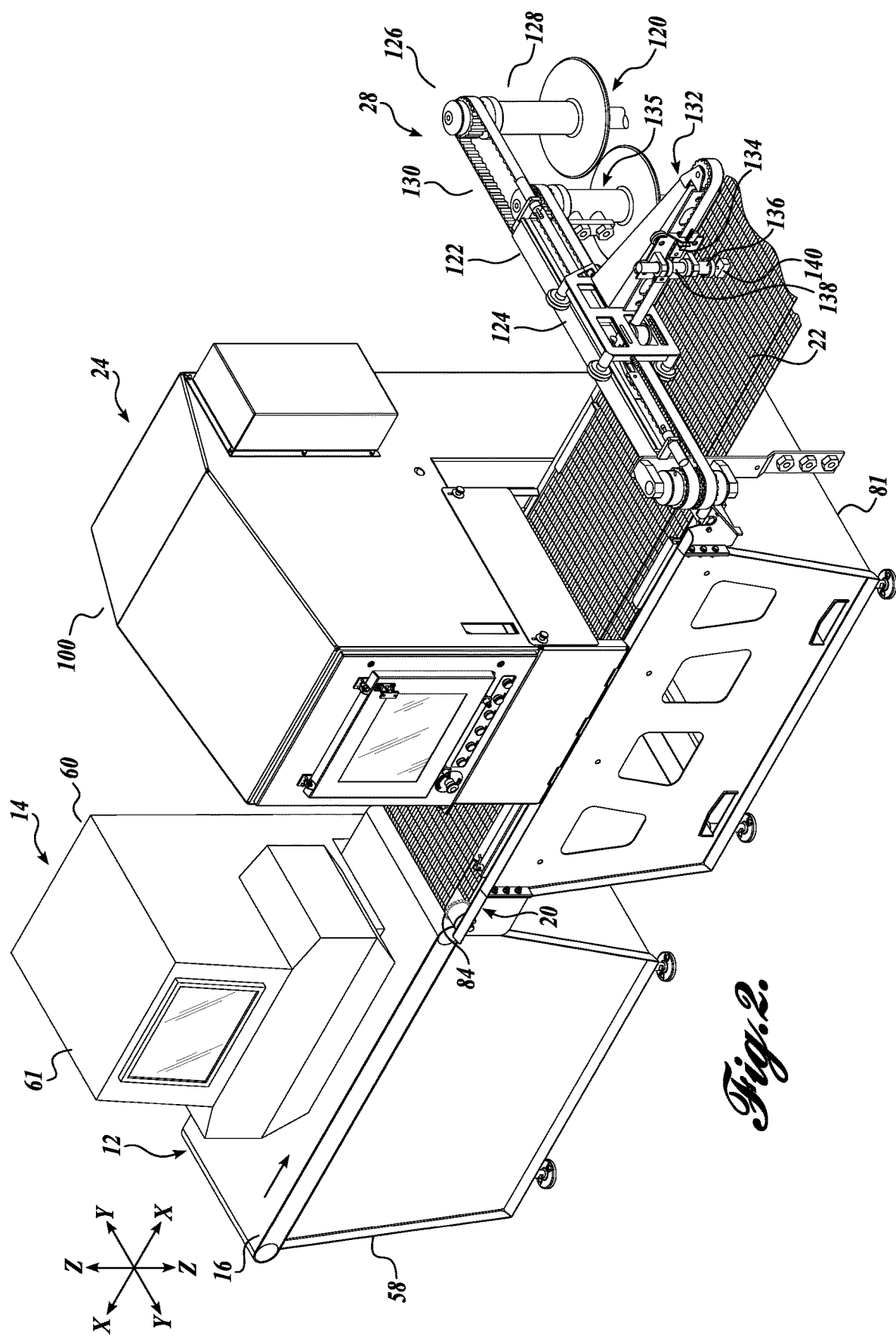
FIG. 2 is a fragmentary pictorial view of the system shown in FIG. 1.

A first embodiment of a processing system 10 is illustrated in FIGS. 1 and 2 as including a first or upstream conveyor 12 for carrying work products WP, such as food products, past an X-ray scanning station 14 while being transported on a conveyor belt 16 that is impervious to X-rays emitted at the scanning station. The work products WP are inspected at scanning station 14 to ascertain physical parameters of work products WP pertaining to size and/or shape of the work products. Such parameters may include, for example, the length, width, aspect ratio, thickness, thickness profile, contour, outer contour configuration, perimeter, outer perimeter configuration, outer perimeter size and shape, volume and/or weight, as well as whether the work products contain any undesirable materials, such as bones, fat, cartilage, metal, glass, plastic, etc. and the location of the undesirable materials in the work products. The results of the scanning occurring at station 14 are transmitted to a processor 18. After the work product has been scanned at station 14, it is transferred to a second or downstream conveyor 20 located downstream of the first conveyor 16. The second conveyor 20 includes a belt 22 of a grid or open construction. An optical scanning station 24 is located along conveyor 20 to ascertain physical parameters of the work product, including, for example, the physical parameters pertaining to the size and/or shape of the work product as identified above in the discussion of scanning the work products WP at the X-ray scanning station 14.

The results of the optical scanning occurring at station 24 are transmitted to the processor 18. The processor 18 analyzes the data from the X-ray scanning station 14 and the optical scanning station 24 first to confirm that the work product scanned at station 24 is the same as the work product previously scanned at station 14. Once this identity is confirmed, then if there has been any sufficient movement or shifting of the work product during the transfer from the first conveyor to the second conveyor, or any significant distortion of the shape of the work product, the applicable information or data from the X-ray scanner is translated (also referred to as "transformed") by the processor onto the corresponding data generated by the optical scanner. Such translation may include one or more of: shifting of the work product in the X and/or Y direction; rotation of the work product; scaling of the size of the work product; and shear distortion of the work product, as more fully discussed below.

Thereafter, the location of the undesirable material within the work product is ascertained (mapped) from the work product scanned at the X-ray station 14 onto the work product as scanned by optical scanner 24 and subsequently translated. The undesirable material is removed from the work product at cutting station 28 using one or more cutters controlled by a controller 26 operating under instructions from processor 18. The work product may also (or alternatively) be portioned at cutting station 28. Thereafter, at pickup station 30, either the work product WP and/or the material removed from the work product is picked up and transferred to a takeaway conveyor, storage bin or other location, not shown.

Describing the foregoing components/aspects of the processing system 10 in more detail, as schematically shown in FIG. 1, the processor 18 includes an interface 40 for receiving signals and information from scanning stations 14 and 24 and from other data sources of system 10, as described more fully below. A memory unit 42 is provided for storing information regarding the processing system 10. A keyboard or other input device 44 is provided to enable an operator to communicate with the processor 18. Also, a display or other output device 46 is provided to convey information from the processor to the operator, including the functioning of the processing system 10. The processor 18 also includes a controller 26, which may be in the form of a programmable logic controller or other type of controller, for controlling the operation of the system 10, including the conveyors 16 and 20, the X-ray scanning station 14, the optical scanning station 24, the cutter station 28, and the pickup station 30. The processor 18 can be connected to a network 48. Also, rather than employing a local processor 18, a network computing system can be used for this purpose.

Referring specifically to FIGS. 1 and 2, conveyor 12, as noted above, includes an X-ray permeable endless belt 16 that is trained over drive roller 50 and an idler roller 52. The drive roller 50 can be powered in a conventional manner. An encoder 54 can be associated with the drive roller 50 to monitor the location or position of the belt 16 along the length of the conveyor 12. The conveyor 12 may be supported by legs 56 or by an underlying framed housing 58 or by another appropriate structure.

As noted above, the conveyor belt 16 is made from material that is permeable to X-rays, such as rubber, plastic, or a combination of both. Because of this construction, X-rays easily pass through the conveyor belt to impinge upon a detector 62 located beneath the upper run of the conveyor belt 16.

The system 10 is not limited to the use of conveyor 12 for moving the work products WP either continuously or intermittently. In this regard, the conveyor 12 can be replaced with moving platforms for carrying the workpieces WP or other conveyance mechanisms. In these alternative embodiments, the X-ray scanning station 14 may be arranged so that the X-rays are directed at the work product WP in a horizontal direction rather than vertically as depicted in FIGS. 1 and 2.

At X-ray scanning station 14, an X-ray scanner system 60 is used to inspect the work products WP, including food products, to determine if any undesirable material, such as bones, fat, metal, plastic, glass, is located within the work product. The X-ray system 60 is schematically shown in FIG. 1, whereas FIG. 2 depicts a housing 61 that contains the X-ray system.

Generally, X-rays are attenuated as they pass through an object in proportion to the total mass of the material through which the X-rays pass. The intensity of the X-rays received at an X-ray detector, such as detector 62, after they have passed through an object such as work product WP is therefore inversely proportional to the density of the object. For example, X-rays passing through a chicken bone, or a fish bone, which have a relatively higher density than the chicken flesh or the fish flesh, will be more attenuated than the X-rays that pass only through the meat of the chicken or the fish. Thus, X-rays are suited for inspecting workpieces to detect the existence of undesirable material having a specific density or X-ray modification characteristics. A general description of the nature and use of X-rays in processing workpieces can be found in U.S. Pat. No. 5,585,605, incorporated herein by reference.

Figure 3:
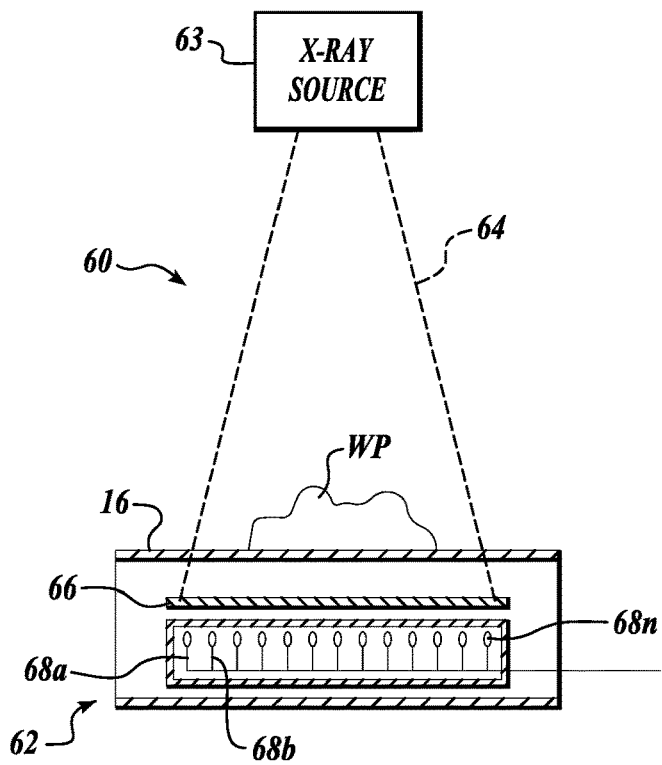
FIG. 3 is a schematic view of an X-ray scanner which may be utilized with the present system and method.

Referring to FIG. 3, the X-ray scanning system 60 includes an X-ray source 63 for emitting X-rays 64 toward workpiece WP. An array of X-ray detectors 62 is located adjacent and beneath the upper run of conveyor belt 16 for receiving the X-rays 64 that have passed through the workpiece WP when the workpiece is within the scope of the X-rays 64. Each of the X-ray detectors in the array 62 generates a signal corresponding to an intensity of the X-rays impinging on the X-ray detector. The signals generated by the X-ray detector array are transmitted to processor 18. The processor processes these signals to determine the existence and location of any undesirable material present in the workpiece WP.

The system 10 may include a position sensor in the form of encoder 54 that generates the signal indicative of the position of the workpiece WP along the length of conveyor 12 as the workpiece is moved on the conveyor with respect to the X-ray station 14. The position of the workpiece along the length and width of the conveyor 12 can be ascertained by the X-ray system. As noted above, the X-ray system can also provide other information with respect to a workpiece, including physical parameters pertaining to the size and/or shape of the workpiece, including for example, the length, width, aspect ratio, thickness, thickness profile, contour, outer contour configuration, perimeter, outer perimeter configuration, outer perimeter size and/or shape, volume and/or weight, as well as other aspects of the physical parameters of the workpiece. With respect to the outer perimeter configuration of the workpiece WP, the X-ray detector system can determine locations along the outer perimeter of the workpiece based on an X-Y coordinate system or other coordinate system.

Continuing to refer specifically to FIG. 3, the X-ray detector array 62 includes a layer of scintillator material 66 located above a plurality of photodiodes 68a-68n. The X-ray source 63 is located a sufficient distance above the conveyor belt 16 so that the X-rays 64 emitted from the X-ray source 63 completely encompass the width of the X-ray detector array 62. The X-rays 64 pass through the workpiece WP, through the conveyor belt 16 and then impinge upon the layer of scintillator material 66. Since the photodiodes 68a-68n respond only to visible light, the scintillator material 66 is used to convert the X-ray energy impinging thereupon into visible light flashes that are proportional to the strength of the received X-rays. The photodiodes 68 generate electrical signals having an amplitude proportional to the intensity of the light received from the scintillator material 66. These electrical signals are relayed to the processor 18.

The photodiodes 68 can be arranged in a line across the width of the conveyor 16 for detecting X-rays passing through a "slice" of the workpiece WP. Alternative photodiode layouts are possible, of course. For example, the photodiodes may be positioned in several rows into a grid square to increase the scanning area of the X-ray detector 60, as shown in FIGS. 1-3.

Other embodiments of the X-ray scanner system 60 may be utilized, which are also capable of detecting the intensity (or attenuation) of the X-rays that have passed through the workpiece WP to determine the existence of undesirable material within the workpiece. For example, referring to FIG. 4, an alternative embodiment of an X-ray detector system 60' includes a fluoroscope screen 70 and a video camera 72. When the X-rays 64 impinge on the fluoroscope screen 70, the screen is activated to produce light flashes in proportion to the attenuation of the impinging X-rays. The light flashes are then recorded by the video camera 72, or other device capable of capturing the "picture" produced by the fluoroscope screen 70. The image captured by the video camera 72 is then transmitted to processor 18, and converted into digital values related to the intensity of the light generated by the fluoroscope screen 70.

Further alternatively, direct flat panel X-ray imaging technology or direct radiography may be used. For example, an array of amorphous selenium detectors may be used as an X-ray detector to directly detect the intensity of the impinging X-rays, and to transmit the intensity to the processor 18.

Once the work product WP has passed by scanning station 14, the work product travels to the end of the first or upstream conveyor 12 and then is transferred to the second or downstream conveyor 20. As noted above, the input end of the second conveyor 20 is located closely adjacent the output end of conveyor 12 so that work products WP can be transferred from conveyor 12 to conveyor 20 with minimal "disruption." This means that in the transfer of the workpiece WP, the workpiece substantially retains its shape and location side to side on conveyor 20 as well as longitudinally with respect to the other workpieces on the conveyors 12 and 20.

Referring to FIGS. 1, 2 and 5, belt 22 of conveyor 20 is of metallic construction configured in grid or open form so that the waterjet(s) at cutter station 28 is (are) free to pass downwardly through the belt to a collection tank or other receptacle, not shown, positioned beneath the conveyor 20. Various constructs of conveyor belts corresponding to belt 22 are described in U.S. Pat. No. 6,854,590, incorporated by reference herein.

The conveyor 20 can be supported by legs 80 as shown in FIG. 1, or by a housing structure 81, as shown in FIG. 2. The belt 22 is trained around drive sprockets 82 as well as around idler sprockets 84 at the opposite ends of the conveyor. The teeth 86 and 87 of the sprockets 82 and 84 engage links 88 of chains 90 extending along the side margins of the open weave conveyor belt 22, shown in FIG. 5. The belt 22 is composed of formed, flat wire links 92. The belt links 92 are connected by metal cross rods 94 that engage through aligned holes formed in the links 92. Belt 22 can be formed without chains 90, in which case the sprockets 82 and 84 can be designed to engage the outermost portions of belt 22 as shown in FIG. 2.

Figure 4:
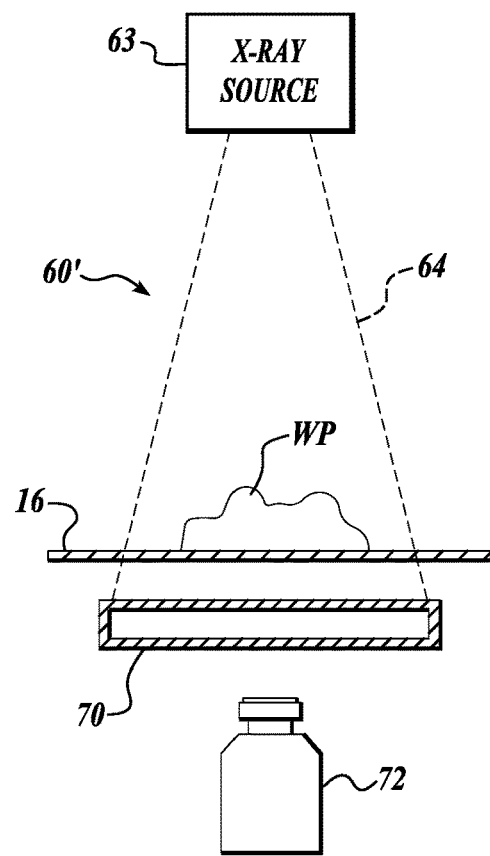
FIG. 4 is a schematic view of another X-ray scanner that may be utilized with the system and method of the present disclosure.

Of course, belt 22 can be of numerous other types of construction, with FIGS. 2 and 4 merely being illustrative of possible constructions. An encoder 96 may be utilized in conjunction with conveyor 20 to generate signals or pulses at fixed intervals corresponding to the rotation of drive sprocket 82 or a drive shaft (not shown) coupled to the sprocket 82. This enables the locations of workpieces moving on conveyor 20 to be known.

As noted above, optical scanning station 24 is positioned along conveyor 20. The optical scanning at station 24 can be carried out using a variety of techniques, including with a scanner 102 located in housing 100 to view workpiece WP illuminated by one or more light sources 104. The light from the light sources 104 is extended across the moving conveyor 20 to define a sharp shadow or light stripe line, with the area forward of the transverse beam being dark. When no workpiece is being carried by the conveyor, the shadow line/light stripe forms a straight line across the belt. However, when a workpiece passes across the shadow line/light stripe, the upper, irregular surface of the workpiece produces an irregular shadow line/light stripe as viewed by a video camera directed downwardly on the workpiece and the shadow line/light stripe. The video camera detects the displacement of the shadow line/light stripe from the position it would occupy if no workpiece WP were present on the conveyor 20. This displacement represents the thickness of the workpiece along the shadow line/light stripe.

The length of the workpiece is determined by the length of the time that the shadow lines are created by the workpiece. In this regard, encoder 96 integrated into the structure of conveyor 20 generates pulses at fixed time intervals corresponding to the forward movement of the conveyor.

The optical scanner 102 is capable of locating the workpiece WP on the belt 22 and thus ascertaining whether the workpiece has shifted in the X and/or Y directions relative to belt 16 after transfer onto belt 22. The scanner 102 is also able to determine whether workpiece WP has rotated relative to the orientation of the workpiece on belt 16 or whether the workpiece has increased or decreased in length or width or otherwise distorted in shape relative to its configuration on belt 16. The exterior configuration of the workpiece is discernable by the scanner 102, which ascertains parameters related to the size and/or shape of the workpiece WP (for example, length, width, aspect ratio, thickness, thickness profile, contour (both two-dimensionally and three-dimensionally), outer contour configuration; perimeter, outer perimeter configuration, outer perimeter size and/or shape, volume and/or weight, of the workpiece). With respect to the outer perimeter configuration of the workpiece, the scanner can determine discrete locations along the outer perimeter of the workpiece in terms of an X-Y coordinate system or other coordinate system. This latter information can be used by the processor to determine/verify that the workpiece being scanned at optical scanning station 24 is the same workpiece as previously scanned at the X-ray scanning station 14. For example, the processor can compare the data identifying coordinates along the outer perimeter of the workpiece as determined by scanning station 24 with the corresponding data obtained previously at X-ray scanning station 14. If the data sets match within a fixed threshold level, then confirmation is provided that the workpiece scanned at optical station 24 is the same as the workpiece previously scanned at the X-ray scanning station 14.

However, if for example, a workpiece was removed from the conveyor 12, or from conveyor 20, before the removed workpiece reaches the optical scanning station 24, then the next workpiece scanned at optical station 24 will not match the scanning data from the X-ray scanning station 14 since such X-ray scanning data will correspond to the workpiece that has been removed. Thus, the processor 18 will determine that there is not a match between the perimeter coordinate data sets of the workpieces from the scanning stations 14 and 24. As such, the optical scanner 102 will scan the next workpiece which passes beneath the scanning station 24 to determine whether such next workpiece matches the scanning data of a workpiece scanned at the X-ray scanning station 14 and transmitted to the processor 18. The processor will determine whether the workpiece scanned at the optical station 24 corresponds to the workpiece that was scanned at the X-ray scanning station right after the X-ray scanning of the removed workpiece occurred. The processor 18 will match the correct scanning data from the X-ray scanning station 14 with the scanning data of the same workpiece from the optical scanning station 24. Of course, this is essential so that the location of the bones or other undesirable material within the workpiece WP located by the scanner 14 coincides with the workpiece scanned by optical scanner 24, since this information is utilized by the controller 26 to control the operation of cutters at the cutting station 28 to excise the bones or other undesirable material from the workpiece.

The processor will go through the "matching" process a finite number of times. One example of determining the number of data sets from the X-ray scanning that must be checked can be determined as follows. Divide the distance between scanners by the sum of the length of product+ the product gap+ a dimensional factor of safety. For example, if there is a disclosure of 9 feet between the x-ray and optical scanners, and the workpieces are approximately 450 mm long product, then the maximum number of data sets in the queue that will be checked is calculated by: 9*12/(17.7+2+

2)=4.9, so five matching attempts are made. The data set from the optical scanner will be compared to five data sets from the X-ray scanner stored in memory unit 42. For longer length products the number of data sets in the memory queue is smaller than for shorter work products. Also, if the distance between the scanners is short enough, only one matching comparison is carried out. Also, it will be appreciated that differences or changes in belt speed can change the number of comparisons that are possible. With faster belt speed, there may need to be a larger gap between products and/or a larger safety margin and there will be less time to make the necessary calculations.

If no match occurs, a "no cut" error or "no match found" error message is generated. The system proceeds to the next workpiece arriving in the optical scanner, and searching for the new workpiece is initiated.

If for example one workpiece is removed from the conveyor 12 after the X-ray scanning but before the optical scanning, only two matching attempts should be required before a match occurs. However, in the unlikely event that a workpiece WP is so distorted in the transfer from belt 16 to belt 22 that the system 10 fails to recognize the X-ray image of the workpiece, then after the predetermined matching attempts the workpiece will proceed down the belt 22 without being cut and/or trimmed/portioned. The above noted error message is generated and the uncut workpiece can be identified or marked by the system 10 and can be removed to a specific location for re-working or other disposition.

As an alternative to not cutting or trimming the workpiece, the system can use the last best available match to cut/trim the workpiece. In this regard, a suboptimal cut/trim of the workpiece may occur, which nonetheless may be valuable or useful. However, if suboptimal cuts/trims lead to lost yield, such cuts/trims can be avoided.

It will be appreciated that there is no attempt to continuously track the location of the workpiece WP from X-ray scanning station 14 to optical scanning station 24. Rather, the foregoing described methodologies are used to match the workpiece scanned at X-ray scanning station 14 with the same workpiece scanned at optical station 24. Also, although the foregoing description does indicate that the system of the present disclosure can be used to locate the workpiece on the first and/or second conveyor at one or more specific points in time, the specific location of the workpiece is not continuously tracked. Moreover, in the present system 10, it is not necessary to locate the workpiece at any specific time along the conveyor 12.

The scanning data from the scanning stations 14 and 24 can be used to determine whether or not the workpiece has transferred accurately from conveyor belt 16 to conveyor belt 22 and determine what level of physical distortion or movement of the workpiece has occurred during the transfer process. Such distortion or movement may include shifting of the workpiece side-to-side with respect to the center line or other datum line of the conveyors. The workpiece may also have shifted longitudinally along the length of the conveyor relative to the position of the workpiece on the conveyor 16.

Figure 6A:
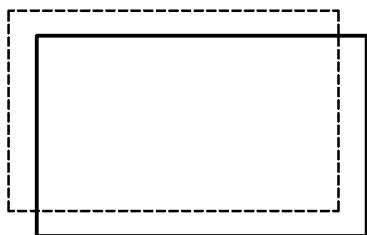
FIGS. 6A-6F schematically illustrate the manner in which work products may move or distort when transferred from a first conveyor belt to a second conveyor belt.

If shifting of the workpiece occurs in the X and/or Y direction(s), then processor 18 functions to translate or manipulate the X-ray image of the workpiece and the underlying data from the X-ray imaging to the optically scanned image of the workpiece so as to improve the match of the shapes or outlines of the workpieces. This translation is schematically illustrated in FIG. 6A, wherein the workpiece as scanned at X-ray station 14 is shown in broken line and the workpiece as scanned at optical scanning station 24 is shown in solid line. The processor 18 translates the broken line image onto the optical image shown in solid line in FIG. 6A.

Figure 6B:
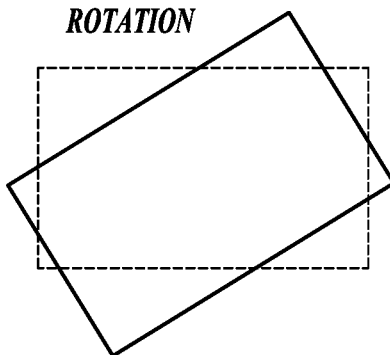

Transfer of the workpiece from conveyor belt 16 to conveyor belt 22 may also result in rotation of the workpiece as shown in FIG. 6B, wherein the workpiece as scanned by X-ray scanning station 14 is shown in broken line, whereas the workpiece as scanned by the optical scanning station 24 is shown in solid line. So that the cutter(s) at the cutter station 28 can accurately cut the bones or other material from the workpiece WP, the outline or shape data from the X-ray scanner is transformed onto the image data from the optical scanner 24.

Figure 6C:
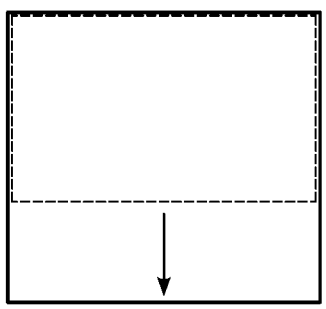
Figure 6D:
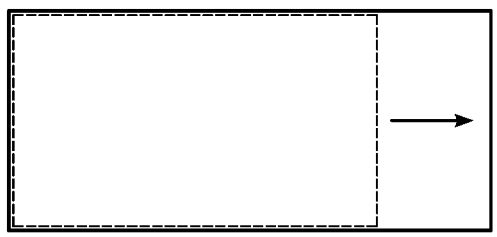

A further type of distortion that may occur during transfer of the workpiece from belt 16 to belt 22 is that the workpiece may increase or decrease in scale (length) in the Y direction (across belt 22) and/or in the X direction (along belt 22). FIG. 6C shows that the workpiece has increased in scale in the Y direction, whereas FIG. 6D shows that the workpiece has increased in scale in the X direction. Of course, the workpieces may also decrease in scale in the X direction, especially if the scale is increased in the Y direction, and vice versa the workpiece may decrease in scale in the Y direction especially if increased in scale in the X direction. Nonetheless, the scanning data from the X-ray scanner 14 is transformed in terms of X and Y scale to the workpiece as scanned by the optical scanner 102.

Figure 6E:

Another form of distortion that may occur during the transfer of the workpiece from conveyor belt 16 to conveyor belt 22 is a distortion in shear in the X direction, as shown in FIG. 6E. In shear distortion, the workpiece may progressively distort or shift in the X direction across the width of the workpiece as shown in FIG. 6E. Of course, the shear distortion may occur as a mirror image as that shown in FIG. 6E. Also, the shear distortion is shown as occurring progressively linearly across the workpiece, but the shear distortion also may be non-linear across the workpiece. As with other types of distortion, shear distortion may be due to various causes, such as a difference in the speeds of the conveyors or imperfect alignment of the two conveyors. As a result, in the direction across the conveyor belt, the workpiece may have progressively shifted rearwardly or forwardly relative to the direction of travel of the conveyor belt.

FIG. 6E shows a forward (in the right-hand direction) shifting of the workpiece on the second conveyor belt 22 due to shear distortion. As noted above, of course the shear distortion could have occurred in the opposite direction (in the left-hand direction) so that the workpiece extends rearwardly relative to the nominal position of the workpiece going across the conveyor belt.

Figure 6F:
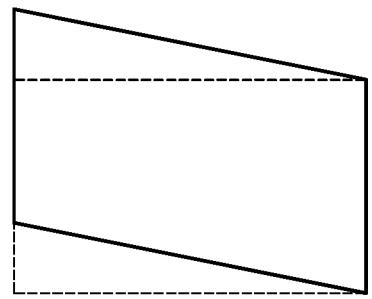

FIG. 6F illustrates that shear distortion can occur in the Y direction, wherein the workpiece shifts laterally relative to the belt along the length of the workpiece. FIG. 6F shows shear distortion of the workpiece in the Y direction (upward along the page). It will be appreciated that the shear distortion may occur in the opposite direction than as shown in FIG. 6F.

Regardless of the direction of the shear distortion, the data from the X-ray scanning is transformed onto the workpiece as scanned at the optical scanning station. Once the needed transformations have occurred to correct for movement and/or distortion of the workpieces, the shape, size, and outline of the workpiece from the optical scanning has been better matched to the position, orientation, and/or shape of the workpiece as scanned by the optical station. Thereafter, other data from the X-ray scanning can be mapped onto the transformed workpiece, including the location of bones or other materials or defects to be excised from the workpiece. Such mapping can be carried out by well-known techniques.

It will be appreciated that without the foregoing transformation step or steps to correct or adjust for the distortion and/or shifting that may have occurred to the workpiece during transfer from conveyor 16 to conveyor 22, the mapping of the location of the bones or other undesirable material as located during X-ray scanning to the workpiece as optically scanned may result in inaccurate information as to the position(s) of the bones, defects, or other undesirable material within the workpiece. Thus, attempts to excise the bones or other undesirable material from the workpiece may prove unsuccessful. Also, the workpiece may not be accurately portioned in the manner desired.

As with the "matching" analysis described above to verify that the workpiece optically scanned at optical scanning station 24 is the same workpiece that was previously scanned at X-ray scanning station 14, the data sets analyzed by the processor 18 to perform the above transformations may consist of coordinate locations along the outer perimeter of the workpiece. In this regard, the processor 18 may compare the data consisting of coordinate locations along the outer perimeter of the workpiece as determined at the X-ray scanning station 24 with the corresponding coordinates of the same locations along the outer perimeter of the workpiece as determined at the optical scanning station 44. Such comparison of the data sets can be used to determine whether or not the workpiece upon transfer to the conveyor belt 22 has distorted or shifted, for example, in X-Y translation, rotation about the Z axis. Mismatch of the data sets will indicate what type(s) of distortion occurred and the extent of such distortion so that an appropriate correcting transformation of the X-Y scanning data can be applied to the workpiece as scanned by the optical scanner 102.

Once the workpiece has passed the optical scanning station 24, it moves on to the cutting station 28. As described above, the information from the X-ray scanning station and the optical scanning station are combined so that the location of bones or other material to be removed from the workpiece is accurately determined with respect to the workpiece and thereby can be excised at the cutter station 28.

Various types of cutting devices can be utilized at cutting station 28 to remove bones and other undesirable material from the workpiece as well as to cut or portion the workpiece as desired. One type of cutter that may be used employs high-pressure waterjets as disclosed in U.S. Pat. Nos. 4,875,254, 5,365,186, and 5,868,056, and incorporated herein by reference. Other types of cutting devices that may be utilized include band saws, reciprocating saws, circular saws, guillotine knives and lasers. If the workpieces are to be portioned, they can be cut into desired portion sizes, portion weights, portion shapes, portion thicknesses, maximum fat content, or other parameters by using these same cutting devices.

FIG. 2 illustrates one particular cutting apparatus 120 that may be utilized in conjunction with the present disclosure. The apparatus 120 in basic form includes a support structure 122 extending across the conveyor 20 for supporting and guiding a first carriage 124 for movement transversely to the direction of movement of the conveyor. The carriage 124 is powered by a drive system 126 including, in part, a motive system 128 and a drive train 130. A second, longitudinal support structure 132 is cantilevered outwardly from carriage 124 in a direction generally aligned with the direction of movement of the conveyor 20. A second longitudinal carriage 134 is adapted to move along longitudinal support structure 132 by the drive system 126. In this regard, a second motive system 135 powers the longitudinal carriage 134 through the drive train 130.

A high-speed waterjet nozzle assembly 136 is mounted on the longitudinal carriage 134 to move therewith as the nozzle operates on (cuts) the underlying workpiece WP being carried by the conveyor 20. The nozzle assembly 136 includes a body portion 138 that is secured to the carriage 134. The nozzle assembly 136 also includes a lower outlet tip 140 directed downwardly towards conveyor belt 22. High-pressure liquid nozzle assemblies of the type of nozzle assembly 136 are articles of commerce. High-pressure water is supplied to nozzle assembly 136 by supply lines, not shown, in a manner well-known in the art.

In operation, as workpieces WP are carried along conveyor 20, the nozzle assembly 136 is moved along selected paths of travel by carriages 124 and 134 powered by drive system 126. Carriage 124 moves the nozzle assembly 136 transversely, and carriage 134 moves the nozzle assembly longitudinally relative to the direction of travel of the conveyor 20. This enables the nozzle assembly to travel quickly along routes which are programmed into the operation of the servo motors of the motive systems 128 and 135 by processor 18.

Once the bones or other undesirable material from the workpiece WP have been cut or otherwise removed, or once the workpiece has been portioned, the processed workpiece(s) may be removed from the conveyor 20 at pickup station 30. At station 30, one or more pickup devices 150 are controlled by controller 26 for removing the portions/cut workpieces from the conveyor 20 for placement on a takeaway conveyor (not shown) or other location.

The pickup device 150 may be automatically operated by the controller 26. In this regard, the controller 26 tracks the location of the workpiece WP on the conveyor 20 and uses this known location to control the operation of pickup device 150 to automatically remove the workpiece from the conveyor. The pickup device 150 may include an attachable portion 152 capable of secure attachment with the workpiece WP so as to lift the workpiece from the conveyor belt 22 and carry the workpiece laterally or longitudinally relative to the direction of movement of the conveyor 22, to a takeaway conveyor or other location. The attachable portion 152 may utilize suction action or other methodology to grasp a portion/trimmed workpiece WP. Pickup devices suitable for use in conjunction with the present invention are disclosed in U.S. Pat. No. 6,826,989, incorporated herein by reference.

It is to be appreciated that workpieces WP that have been portioned may be removed from the conveyor 20 by other methods in addition to using pickup devices 150. For example, an arm (not shown) may be used to push or sweep the workpieces from the belt 22, or a powered ram can be employed to push or sweep the workpieces from the conveyor. As a further alternative, the workpieces may be allowed to simply fall off the end of the conveyor onto another conveyor, into a container, etc. Thus, the present disclosure is not intended to limit the disposition of the workpieces after being cut and/or portioned.

One method 158 of utilizing the processing system 10 of the present disclosure is schematically illustrated in FIG. 7. The process begins at step 160 wherein workpieces are loaded onto flat belt conveyor 16 at step 162. Thereafter, the workpieces are scanned using X-ray detector system 60 at scanning station 14 at step 164. Next, at step 166, the data from the scanning of the workpiece is transmitted to processor 18 represented by step 168.

Thereafter, at step 170, the workpiece is transferred from the X-ray scanning conveyor 12 to the portioning conveyor 20 at step 170. Next at step 172, the workpiece is optically scanned at optical scanning station 24 utilizing optical scanner 102. Further in step 174, the data generated at optical scanning station 24 is transmitted to the processor 18. This transmission of data is also represented by step 168.

Thereafter, at step 176, the processor 18 compares the optical scanned data with the previously received X-ray scanned data to determine whether or not the work product WP being optically scanned is the same as that which was previously scanned by the X-ray scanner. As discussed above, the data being compared can consist of coordinate locations along the outer perimeter of the workpiece.

Various methods and techniques can be used to compare the first data set from the X-ray scanner 60 with the second data set from the optical scanner 102 to verify that the food item scanned by the optical scanner corresponds to the same food item previously scanned by the X-ray scanner. For example, the Root Mean Square (RMS) error between the two data sets can be calculated and such error value compared with the maximum RMS previously established for verifying that the food item scanned by the X-ray scanner is the same as the food item scanned by the optical scanner. In this regard, an RMS error is calculated for each corresponding coordinate locations along the outer perimeter of the workpiece. In essence, the difference in position of each of the coordinates is calculated as the root square of the sum of the squares of the difference in X and Y coordinate values. Thereafter, the square values of these distances are summed up, and the sum is divided by the number of corresponding coordinate pairs. Finally, the square root of the quotient is taken as an RMS error. The calculated RMS error is compared with the pre-established maximum RMS error allowable and still concluding that the same workpiece was scanned by the optical scanner and the X-ray scanner.

Another analysis methodology that may be utilized is by determining the difference in the X and Y coordinate values of each location along the workpiece and selecting a standard deviation that defines an acceptable variation or difference in the X-Y coordinate values. In this technique, a confidence level may be defined in terms of the standard deviation at each of the various coordinate locations along the perimeter of the workpiece. An acceptable confidence level or level of allowable standard deviation between the X-Y coordinate is established ahead of time.

Other regression analysis techniques may also be utilized, for example the least squares regression analysis.

If it is determined that the workpiece from the optical scan matches that of the previous X-ray scan, then at step 178, the processor proceeds to determine if there is a need to transform physical parameter data from the X-ray scanning results to the optical scanning results due to movement or distortion of the workpiece when transferred to the second conveyor 20. As discussed above, such distortion may include X and/or Y translation of the workpiece, rotation of the workpiece about the Z axis, change in scale of the workpiece in the X and/or Y directions, and shear distortion in the X and/or Y directions. If sufficient shifting or distortion in the workpiece WP has occurred, then the requisite transformations are carried out by the processor 18. As a result, a close match is achieved between the configuration, including, for example, outer perimeter and size and shape of the workpiece as scanned by the X-ray scanner 60 and optically scanned by the optical scanner 102.

If, on the other hand, it is determined that the workpiece WP from the optical scan does not match that of the previous X-ray scan, then the processor at step 177 compares the optically scanned data with the next data set received from the X-ray scanning to determine whether the next workpiece on the conveyor belt is the same as the workpiece from the optical scan. In this situation, if a single workpiece was removed from either first conveyor 12 or second conveyor 20 at a location upstream from the optical scanning station 24, then the next workpiece traveling along the conveyors will correspond to the workpiece which was optically scanned. However, if more than one workpiece WP was removed from the conveyors upstream from optical scanning station 24, then the processor 18 continues with the comparison analysis until a match occurs between the workpiece, which has been optically scanned, and the corresponding workpiece which has been scanned at X-ray scanning station 14. Once a match has been achieved in the data sets from the X-ray scanning and the optical scanning, then the process moves to step 178 to determine if there is a need to carry out any transformations as discussed above.

Next, at step 180, the location of bones or other undesirable material as determined by the X-ray scanning is mapped onto the configuration of the work product as determined from the optical scanning and after necessary transformations have been applied, as discussed above. Therefore, in step 182, the cutting path for the waterjet or other type of cutter is generated by the processor 18. Next, in step 184, the workpiece is cut to remove bones or other undesirable material and/or to portion the workpiece into desired sizes, weights, shapes, etc. Then lastly, in step 186, the work product that has been processed by removing bones or other undesirable features, or portioned in accordance with desired physical parameters, is offloaded, for example, to a takeaway conveyor, a collection bin, etc.

Figure 9:
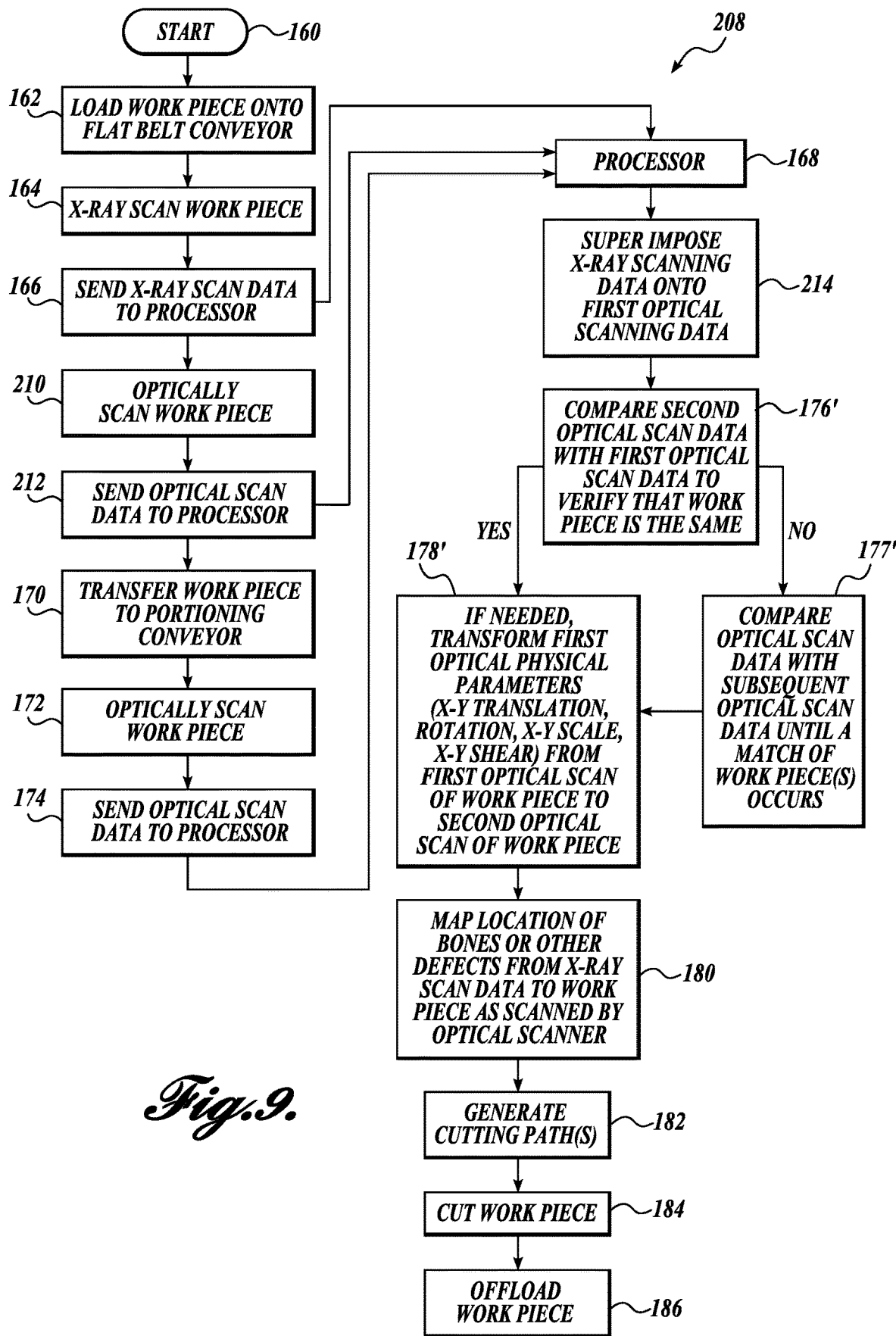
FIG. 9 is a flow diagram corresponding to the method depicted in FIG. 8.

FIGS. 8 and 9 illustrate an alternative system 10' and method in accordance with the present disclosure. The components and parts of system 10' that are the same as in the FIGS. 1-6 and the steps of method 208 that are the same as in FIG. 7 are identified with the same part numbers, and their descriptions will not be repeated here. Rather, the following description will focus on the changes or differences in the system 10' and method 208 as shown in FIGS. 8 and 9 relative to that illustrated in FIGS. 1-7. Nonetheless, it is to be understood that applicable components and parts of system 10' do apply to the embodiment of FIG. 4. The same applies to steps of FIG. 7 being applicable to the method 208.

Referring to FIG. 8, an optical scanning station 200 is positioned over first conveyor 12 to use an optical scanner 202 to scan workpieces WP while on the first conveyor belt 16. Although the optical scanning station 200 is illustrated as located downstream of the first X-ray scanning station 14, the optical scanning station 200 may instead be located upstream of the X-ray scanning station. Regardless of the location of the optical scanning station 200 relative to the X-ray scanning station 14, the optical scanner 202 could operate in substantially the same manner as scanner 102 described above with respect to scanning the workpiece WP over belt 22 and ascertaining physical parameters of the workpiece. However, other types of optical scanners could be used, including changed coupled devices (CCD) and infrared cameras. Regardless of the types of camera used, an optical image of the workpiece is generated.

One difference in system 10' versus system 10 is that with the optical scanner 200 located at the same belt 16 as X-ray scanner 60, it is possible to superimpose directly the X-ray object data onto the optically scanned data for the workpiece without having to use a "matching" process, instead based just on the time difference between when the image information from the X-ray scanner and the camera was generated, which of course is a function of the speed of the belt 16.

Also, it will be appreciated that the outer contour of the workpiece from the X-ray scanner is not needed to match the workpieces between the two conveyors 12 and 20. The X-ray scanning need only be used to determine cutting paths of the cutter apparatus 120. Further, the determination of the cutting paths can be augmented from the data obtained from the optical scanner 202 at least with respect to defects or other aspects of the workpieces visible to the optical scanner 202, which may not be discernible, or at least not accurately discernible, by the X-ray scanner. Such defects may include, for example, blood spots, changes in color, tears, cuts, other damage to the meat/flesh structure, skin remnants, other deformities, and other undesirable features or defects on the workpieces.

Superimposing the X-ray data onto the optical scan-generated data can occur prior to "creating" the contour outline of the workpiece and determining the locations of undesirable material or defects (e.g., bone) in the workpiece. The data from the scanner 202 is transmitted to processor 18, wherein the processor can create the contour outline of the workpiece being transmitted on the conveyor belt 16 as well as establish the location of the defects within the workpiece. Such data is then utilized by the system 10' in the same manner as described above in which the data from the X-ray scan is utilized by the system 10 to confirm that the workpiece optically scanned on belt 22 is the same as the workpiece previously scanned (by X-ray) on belt 16. This data is also utilized to carry out any transformations needed due to movement or distortion of the workpiece from the transfer from conveyor 16 to conveyor 22. In addition, this information is utilized to map the location of defects onto the workpiece configuration on conveyor 22 as scanned by scanner 102 so that cutting apparatus 120 can be controlled to portion and/or cut the workpiece to remove defects. Other than as described above, the processing apparatus 10' shown in FIG. 8 is the same as the processing apparatus 10 shown in FIGS. 1-6. Since the imaging process of the two optical scanning or imagers 202 and 102 are similar, a better match between the data from the two optical systems may occur when using data from X-ray scanning station 14 and optical scanning station 24.

FIG. 9 illustrates one method 208 of utilizing the processing system 10' shown in FIG. 8. As apparent, the steps of the method 208 shown in FIG. 9 are for the most part the same or very similar to the steps for the process 158 shown in FIG. 7. However, in FIG. 9, the process 208 includes an optical scanning step 210 which involves the scanning of the work product WP while on the first conveyor 12, for example, after the X-ray scanning step 166. Alternatively, the optical scanning step 210 can occur prior to the X-ray scanning step 166.

As shown in FIG. 9, the data from optical scanning step 210 is transferred at step 212 to the processor 18. At step 214, the processor superimposes the data from the X-ray scan directly onto the data from the first optical scan. Thereafter, the processor creates the contour outline of the workpiece and represents such contour outline, for example, in the form of X/Y coordinates along the contour outline, as described above with respect to process 158. The processor 18 also analyzes the data from the X-ray scan and first optical scan to identify the location of defects (e.g., bones) within the workpiece WP.

As another variation from process 158, in process 208 at step 176' the processor compares the optical scanned data from scanner 102 with the optical scanned data from scanner 202 to verify that the workpiece viewed by the optical scanner 102 is the same as the workpiece viewed by the optical scanner 202. As another variation or alteration, in step 178', required transformations occur between the data from the optical scanner 202 to the data from the optical scanner 102. Other than the foregoing differences, the method 208 illustrated in FIG. 9 is essentially the same or very similar to the method 158 illustrated in FIG. 7 and described above.

Figure 10:
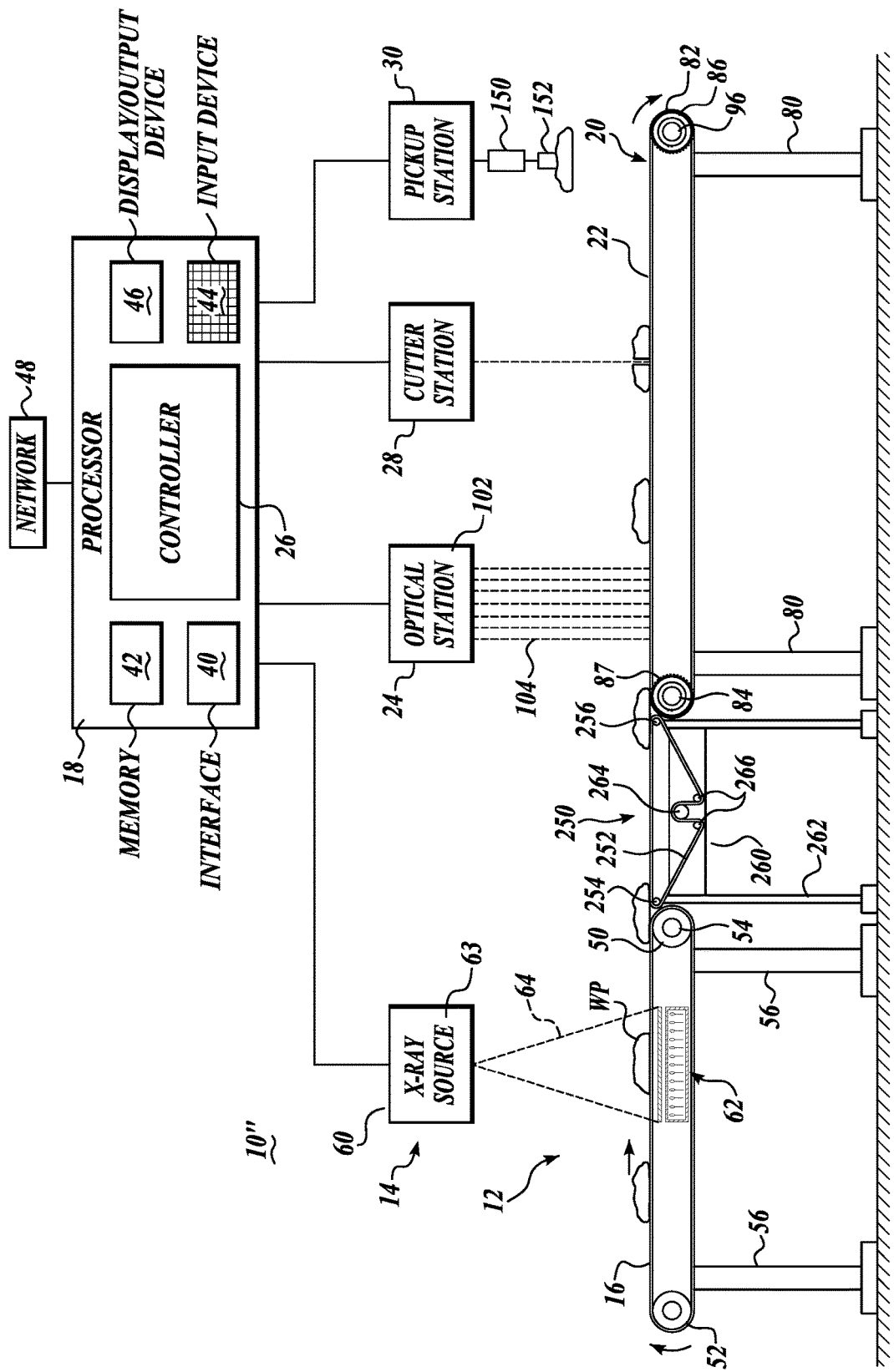
FIG. 10 is a schematic representation of a third embodiment of an apparatus and method for processing work products in accordance with the present disclosure.

FIG. 10 illustrates an alternative system 10" and method in accordance with the present disclosure. The components and parts of system 10" that are the same as in FIGS. 1-6 and 8 are identified with the same part numbers, and their descriptions will not be repeated here. Rather, the following description will focus on the changes or differences in the system 10" as shown in FIG. 10, relative to that illustrated in FIGS. 1-9.

Referring to FIG. 10, a transfer conveyor 250 is interposed between the first or upstream conveyor 12 and the second or downstream conveyor 20 to facilitate transfer of the work product WP from conveyor 12 to conveyor 20 with minimal distortion to the work product. The transfer conveyor 250 includes a conveyor belt 252 trained over end rollers 254 and 256 mounted on a conveyor frame structure 260. As shown in FIG. 10, the frame structure includes legs 262 that support the conveyor 250 between conveyors 12 and 20. The belt 252 is powered by the drive roller 264, which is centrally located along the length of the transfer conveyor 250. Idler rollers 266 are used to increase the wrap of the belt 252 on drive roller 264 to avoid any slippage between the belt 252 and the drive roller 264.

As illustrated in FIG. 10, the outer diameter of the end rollers 254 and 256 are relatively small thereby to enable the ends of the belt 252 to be positioned closely to the corresponding ends of belt 16 and belt 22. Thus, the gap between belt 16 and belt 252 is quite small, and the same with respect to the gap between belt 252 and belt 22. As a consequence, work product WP is able to be transferred from belt 16 to belt 252 and then subsequently from belt 252 to belt 22 with very little shifting, movement or distortion. Ideally, the speeds of belts 16, 252 and 22 are the same, which also facilitates accurate transfer of work product from belt 16 to belt 252 to belt 22.

It can be appreciated that if the elevation of conveyors 12 and 20 are not the same, the transfer conveyor 250 can be utilized to accommodate differences in the heights or elevations of the conveyors. In this regard, the end rollers 254 and 256 may be at different elevations to correspond to the elevations of the adjacent rollers 50 and sprocket 84.

Further, belt 252 can be composed of different types of materials and can be of various constructions, including having a textured conveying surface to achieve a good "grip" with the underside of the work products WP. One such belt construction is disclosed in U.S. Pat. No. 8,683,903, incorporated herein by reference. U.S. Pat. No. 8,683,903 discloses a belt of "flat" construction wherein the top surface of the belt is contoured to define abutment edges to press against the underside of the work product to assist in resisting any rearward sliding of a work product relative to the belt.

As noted above, the processing systems of the present disclosure do not continuously track movement of the work products WP along the conveyors, in this case conveyors 12, 250, and 20. Such continuous tracking may not even be possible with system 10". For example, if the intermediate conveyor 250 were to stop during production operations, x-ray images of the work products WP can still be generated and sent to the optical station 24, but the work products WP will never arrive at the optical station due to the stoppage of conveyor 250. As such, the system 10" cannot continuously track the work products and the system will never know that work products are not going to arrive at the optical scanner 24. Instead, system 10" will simply wait until the next work product arrives at the optical station 24.

While illustrative embodiments have been illustrated and described, it will be appreciated that various changes can be made therein without departing from the spirit and scope of the invention. For example, the processing system 10 may be utilized with the modified method wherein the processor 18 is alerted as to when transfer of the workpiece WP from belt 16 to belt 22 occurs. Knowing the speed of belt 22, the processor 18 can ascertain what particular workpiece WP is subsequently scanned at scanning station 24. This information can be used in lieu of or in addition to the process described above, wherein the optical scanned data from scanning station 24 is compared with the X-ray scanning data from X-ray station 14 to verify that the workpiece at the optical scanning station 24 corresponds to the workpiece previously scanned at the X-ray scanning station 14. The processing system 10 can operate just fine without this additional data; however, such data can serve the function of confirming the results obtained by using the systems 10 and 10' and methods 158 and 208 as described above.

Also, the conveyors 12 and 20 can be constructed other than described above. For example, rather that employing a single drive roller 50 for conveyor 12 and a single sprocket 84 for conveyor 20 and the intersection of these two conveyors, other configurations can be used to place the adjacent ends of the conveyor belts 16 and 22 closer together, to reduce the size of the gap between the belts. For example, two rollers (an upper roller and a lower roller) can be used in place of the single roller 50. Likewise, two sprockets could be used in place of the single sprocket 84. This would "square up" the adjacent ends of the conveyors 12 and 20 so that the gap separating the conveyors could be reduced, thereby to facilitate less distortion and/or movement of the workpiece when transferred from conveyors 12 and 20.

Further, in the processing system 10 the individual first or upstream conveyor 12, second or downstream conveyor 20, and transfer conveyor 250, could be considered as part of a conveyor system rather than simply as individual conveyors. Such conveyor system is controlled and coordinated by processor 18.

In addition, although data transmission and other communications between the X-ray and optical scanners and between/among other components of the present system and method, including the processor 18, is illustrated in the figures as via cables or other hardware, such data/communication can instead be transmitted wirelessly using a Blue Tooth or other protocol. Moreover, various data formats can be used in the system and methods of the present disclosure. One exemplary data format is XML. Another example of a data format is JSON (Java Script Object Notation).

Further, although the system and method of the present disclosure can be used to locate and remove undesirable material and components from food items and other workpieces, as well as for trimming or portioning workpieces, the system and method can be used solely for one of these functions or the other and need not be used for both functions.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for processing food items to perform at least one operation selected from the group consisting of cutting and removing undesirable components from the food items and portioning the food items while the food items are being conveyed on a conveyor system, the method comprising:
   conveying the food items on an upstream conveyor section of the conveyor system;
   scanning the food items on the upstream conveyor section with an X-ray scanner to ascertain physical parameters of the food items, the physical parameters comprising a first data set corresponding to shape and size parameters of the food items and the location(s) of the undesirable components of the food items to be removed therefrom;
   transferring the food items to a downstream conveyor section of the conveyor system positioned downstream of the upstream conveyor section for further conveyance of the food items;
   scanning the food items on the downstream conveyor section with an optical scanner to ascertain physical parameters of the food items comprising the location of the food items on the downstream conveyor section and size and shape parameters of the food items on the downstream conveyor section, at least some of the physical parameters represented by a second data set corresponding to at least one of the size and shape of the food items;
   using a processor for:
   receiving the first and second data sets;
   comparing portions of the first data set from the X-ray scanner with the second data set from the optical scanner; and
   optionally performing translations of the first data set onto the second data set, such translations including one or more of:
      directional translation of the food items;
      rotational translation of the food items;
      scaling the size of the food items;
      shear distortion of the food items;
   performing at least one function selected from the group consisting of locating the undesirable components on the translated food items and determining how to portion the translated food items; and
   performing at least one function selected from the group consisting of cutting the food item to remove the undesirable components and portioning the food items.

2. The method of claim 1, wherein:
   the X-ray scanner ascertains the outer perimeter configuration of the food items on the upstream conveyor section; and
   the optical scanner ascertains the outer perimeter configuration of the food items on the downstream conveyor section.

3. The method according to claim 1, wherein the processor, in comparing portions of the first data set to portions of the second data set, comparing data from the first data set corresponding to locations along the outer perimeter of the food items on the upstream conveyor section with data from the second data set comprising locations along the outer perimeter of the food items on the downstream conveyor section.

4. The method according to claim 1, wherein the processor, in comparing portions of the first data set to portions of the second data set, comparing data from the first data set comprising coordinates corresponding to locations along the outer perimeter of the food items on the upstream conveyor section with data from the second data set comprising coordinates along the outer perimeter of the food items on the downstream conveyor section.

5. The method according to claim 1, wherein performing one or more translations of the outer perimeter of the food item comprises laterally or longitudinally translating the food item, scaling of the food item and/or translating of the food item in shear in the X or Y direction.

6. The method according to claim 1, wherein the X-ray scanner and the optical scanner scanning the food items for size and/or shape parameters comprises scanning the food items with respect to one or more of the food item: length, width, aspect ratio, thickness, thickness profile, contour, outer contour, outer perimeter, outer perimeter configuration, outer perimeter size, volume or shape, and weight.

7. The method according to claim 1, wherein the processor comparing portions of the first data set from the X-ray scanner with the second data set from the optical scanner using an analysis methodology selected from the group consisting of:
a Root Mean Square analysis of the first and second data sets;
a standard deviation analysis of the first and second data sets; and
a least squares regression of the first and second data sets.

8. The method according to claim 1, wherein the location of the food item along the conveyor system from the X-ray scanner to the optical scanner is not monitored.

9. The method according to claim 1, wherein the processor receives the first data set as the food items leave the upstream conveyor section.

10. The method according to claim 1, wherein:
the downstream conveyor section comprises a conveyor belt extending there along; and
the processor, upon receiving the first data set, notes the position of the conveyor belt relative to the downstream conveyor section.

11. The method according to claim 1, wherein the downstream conveyor section comprises a conveyor belt and an encoder monitors the position of the belt along the downward conveyor section.

12. The method according to claim 11, wherein the processor is configured to, upon receiving the first data set, note the position of the conveyor belt on the downward conveyor section via an encoder reading.

13. The method according to claim 1, wherein verifying that the food item scanned by the optical scanner corresponds to the same food item previously scanned by the X-ray scanner by using the processor for comparing portions of the first data set from the X-ray scanner with the second data set from the optical scanner.

14. The method according to claim 1, wherein the processor comparing portions of the first data set from the X-ray scanner with the second data set from the optical scanner to match a second data set to a first data set and to select the first data set that corresponds to the second data set.

15. The method according to claim 1:
wherein the processor, in comparing portions of the first data set from the X-ray scanner with the second data set from the optical scanner, determining if the food item scanned by the optical scanner is the food item previously scanned by the X-ray scanner by comparing the first data set from the X-ray scanner with the second data set from the optical scanner; and
if it is determined that the food item scanned by the optical scanner is not the same food item as previously scanned by the X-ray scanner, then determining if a subsequent food item scanned by the X-ray scanner is the same food item as scanned by the optical scanner.

16. A method for processing food items to perform at least one operation selected from the group of cutting and removing undesirable components from the food items and portioning the food items while the food items are being conveyed on a conveyor system, the method comprising:
conveying the food items on an upstream conveyor section of the conveyor system;
scanning the food items on the upstream conveyor section with an X-ray scanner to ascertain physical parameters of the food items, the physical parameters comprising a data set corresponding to shape and size parameters of the food items and the location(s) of the undesirable components of the food items to be removed therefrom;
scanning the food items on the upstream conveyor section with an optical scanner to ascertain physical parameters of the food items comprising at least one of the size and shape parameters of the food items and optionally the location(s) of undesirable components to be removed from the food items, the ascertained physical parameters represented by a data set corresponding to at least one of the size and shape of the food items and optionally the location(s) of the undesirable components of the food items;
transferring the food items to a downstream conveyor section of the conveyor system positioned downstream of the upstream conveyor section for further conveyance of the food items;
scanning the food items on the downstream conveyor section with an optical scanner to ascertain physical parameters of the food items comprising the location of the food items on the downstream conveyor section and size and shape parameters of the food items on the downstream conveyor section, at least some of the physical parameters represented by a data set corresponding to the size and shape of the food items;
using a processor for:
receiving the data sets from the optical scanners;
comparing portions of the data sets from the optical scanners; and
optionally performing translations of the data set from the optical scanner of the upstream conveyor onto the data set of the optical scanner of the downstream conveyor, such translations including one or more of:
directional translation of the food items;
rotational translation of the food items;
scaling the size of the food items;
shear distortion of the food items;
performing at least one function selected from the group consisting of locating the undesirable components on the translated food items and determining how to portion the translated food items; and
performing at least one function selected from the group consisting of cutting the food item to remove the undesirable components and portioning the food items.

17. The method of claim 16, wherein the optical scanners ascertain the outer perimeter configuration of the food items.

18. The method according to claim 16, wherein the X-ray scanner and the optical scanners scanning the food items for size and shape parameters comprises scanning the food items with respect to one or more of the food item: length, width, aspect ratio, thickness, thickness profile, contour, outer contour, outer perimeter, outer perimeter configuration, outer perimeter size, volume and/or shape, and weight.

19. The method according to claim 16, wherein verifying that the food item scanned by the optical scanner of the downstream conveyor section corresponds to the same food item previously scanned by the optical scanner of the upstream conveyor section by using the processor for comparing portions of the data sets from the optical scanners.

20. The method according to claim 16:
   wherein the processor compares portions of the first data set from the optical scanners to determine if the food item scanned by the optical scanner of the downstream conveyor section is the same food item as previously scanned by the optical scanner of the upstream conveyor section; and
   if it is determined that the food item scanned by the optical scanner of the downstream conveyor section is not the same food item as previously scanned by the optical scanner of the upstream conveyor section, then determining if a subsequent food item scanned by the optical scanner of the upstream conveyor section is the same food item as scanned by the optical scanner of the downstream conveyor section.

\* \* \* \* \*